United States Patent
Ouchi et al.

(10) Patent No.: US 11,284,247 B2
(45) Date of Patent: Mar. 22, 2022

(54) TERMINAL APPARATUS AND METHOD

(71) Applicants: SHARP KABUSHIKI KAISHA, Sakai (JP); FG INNOVATION COMPANY LIMITED, Tuen Mun (HK)

(72) Inventors: Wataru Ouchi, Sakai (JP); Shoichi Suzuki, Sakai (JP); Tomoki Yoshimura, Sakai (JP); Liqing Liu, Sakai (JP); Taewoo Lee, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 88 days.

(21) Appl. No.: 16/759,666

(22) PCT Filed: Nov. 8, 2018

(86) PCT No.: PCT/JP2018/041486
§ 371 (c)(1),
(2) Date: Apr. 27, 2020

(87) PCT Pub. No.: WO2019/093419
PCT Pub. Date: May 16, 2019

(65) Prior Publication Data
US 2020/0296576 A1    Sep. 17, 2020

(30) Foreign Application Priority Data

Nov. 10, 2017    (JP) .............................. JP2017-217078

(51) Int. Cl.
*H04W 8/24* (2009.01)
*H04L 5/00* (2006.01)
(Continued)

(52) U.S. Cl.
CPC ............. *H04W 8/24* (2013.01); *H04L 5/0094* (2013.01); *H04W 72/0446* (2013.01); *H04W 72/0453* (2013.01); *H04W 80/08* (2013.01)

(58) Field of Classification Search
CPC ............. H04W 72/1231; H04W 24/02; H04W 28/0236; H04W 28/0278; H04L 1/18; H04L 1/1812; H04L 27/00
See application file for complete search history.

(56) References Cited

U.S. PATENT DOCUMENTS

| 10,985,893 | B2 * | 4/2021 | Yoshimoto | ............ H04L 5/0055 |
| 11,122,470 | B2 * | 9/2021 | Park | ...................... H04W 36/08 |
| 2019/0090126 | A1 | 3/2019 | Hayashi et al. | |

FOREIGN PATENT DOCUMENTS

| EP | 3429291 A1 | 1/2019 |
| JP | 2017-152911 A | 8/2017 |

(Continued)

OTHER PUBLICATIONS

3rd Generation Partnership Project; Technical Specification Group Radio Access Network; Study on Scenarios and Requirements for Next Generation Access Technologies; (Release 14); 3GPP TR 38.913 v14.0.0 (Oct. 2016).

*Primary Examiner* — Iqbal Zaidi
(74) *Attorney, Agent, or Firm* — ScienBiziP, P.C.

(57) ABSTRACT

A terminal apparatus includes: a receiver configured to receive first information related to query for capability of the terminal apparatus; and a transmitter configured to transmit second information related to the capability of the terminal apparatus, wherein the second information includes third information related to a band combination of operating bands used for carrier aggregation (CA), the band combination supported by the terminal apparatus, and in a case that more than one subcarrier spacings (SCSs) are supported by the terminal apparatus in each of the operating bands, the (Continued)

third information includes fourth information related to a SCS combination that can be applied to the band combination.

6 Claims, 9 Drawing Sheets

(51) Int. Cl.
 *H04W 72/04* (2009.01)
 *H04W 80/08* (2009.01)

(56) References Cited

FOREIGN PATENT DOCUMENTS

WO 2017/154618 A1 9/2017
WO 2017/164222 A1 9/2017

* cited by examiner

| NR Operating Band | UL operating band $F_{UL\_low} - F_{UL\_high}$ [MHz] | DL operating band $F_{DL\_low} - F_{DL\_high}$ [MHz] | Duplex Mode | Supported SCS [kHz] |
|---|---|---|---|---|
| 1 | 1920 – 1980 | 2110 – 2170 | FDD | 15, 30 |
| 2 | 1850 – 1910 | 1930 – 1990 | FDD | 15, 30 |
| 3 | 1710 – 1785 | 1805 – 1880 | FDD | 15, 30 |
| 4 | 1710 – 1755 | 2110 – 2155 | FDD | 15, 30, 60 |
| ... | ... | ... | ... | ... |
| 38 | 2570 – 2620 | 2570 – 2620 | TDD | 15, 30 |
| 39 | 1880 – 1920 | 1880 – 1920 | TDD | 15, 30, 60 |
| ... | ... | ... | ... | ... |
| 66 | 1710 – 1780 | 2110 – 2200 | FDD | 15, 30, 60 |
| 67 | N/A | 738 – 758 | FDD | 15, 30, 60 |
| ... | ... | ... | ... | ... |
| 81 | 2710 – 2780 | 28700 – 29200 | FDD | 15, 30, 60 for UL 120, 240, 480 for DL |
| ... | ... | ... | ... | ... |
| 86 | 7100 – 7800 | 7900 – 8600 | FDD | 60, 120, 240 |
| ... | ... | ... | ... | ... |
| 90 | 17100 – 17800 | 21100 – 22000 | FDD | 60, 120, 240 |
| ... | ... | ... | ... | ... |
| 103 | 25700 – 26200 | 25700 – 26200 | TDD | 60, 120, 240 |
| ... | ... | ... | ... | ... |
| 120 | 36700 – 37700 | 36700 – 37700 | TDD | 60, 120, 240, 480 |
| ... | ... | ... | ... | ... |
| 123 | Reserved | | | |
| ... | ... | ... | ... | ... |

| NR CA Band | NR Band | SCS combination for NR CA Band [SCS#1, SCS#2] [kHz] | | |
|---|---|---|---|---|
| CA_1 | 1 | (15, 15) | (30, 30) | - |
| CA_1a | 1 | (15, 15) | (30, 30) | (15, 30) |
| CA_2 | 2 | (15, 15) | (30, 30) | - |
| CA_2a | 2 | (15, 15) | (30, 30) | (15, 30) |
| ... | ... | ... | ... | ... |
| CA_38 | 38 | (15, 15) | (30, 30) | - |
| CA_38a | 38 | (15, 15) | (30, 30) | (15, 30) |
| ... | ... | ... | ... | ... |
| CA_66 | 66 | (15, 15) | (30, 30) | - |
| CA_66a | 66 | (30, 60) | (60, 60) | (15, 60) |
| ... | ... | ... | ... | ... |
| CA_103 | 103 | (60, 60) | (120, 120) | (240, 240) |
| CA_103a | 103 | (60, 60) | (120, 120) | (240, 240) (60, 120) |
| ... | ... | (60, 240) | (120, 240) | ... |

(b)

| NR CA Band | NR Band | SCS combination for NR CA Band |
|---|---|---|
| CA_1 | 1 | same |
| CA_1a | 1 | both (same, different) |
| CA_2 | 2 | same |
| CA_2a | 2 | both (same, different) |
| ... | ... | ... |
| CA_38 | 38 | same |
| CA_38a | 38 | both (same, different) |
| ... | ... | ... |
| CA_66 | 66 | same |
| CA_66a | 66 | both (same, different) |
| ... | ... | ... |
| CA_103 | 103 | same |
| CA_103a | 103 | both (same, different) |
| ... | ... | ... |

| NR CA Band | NR Band | SCS combination for NR CA Band [SCS#1, SCS#2] [kHz] | | |
|---|---|---|---|---|
| CA_1-1 | 1, 1 | (15, 15) | (30, 30) | - |
| CA_1-1a | 1, 1 | (15, 15) | (30, 30) | (15, 30) |
| CA_2-2 | 2, 2 | (15, 15) | (30, 30) | - |
| CA_2-2a | 2, 2 | (15, 15) | (30, 30) | (15, 30) |
| ... | ... | ... | ... | ... |
| CA_38-38 | 38, 38 | (15, 15) | (30, 30) | - |
| CA_38-38a | 38, 38 | (15, 15) | (30, 30) | (15, 30) |
| ... | ... | ... | ... | ... |
| CA_66-66 | 66, 66 | (15, 15) | (30, 30) | - |
| CA_66-66a | 66, 66 | (15, 15) | (30, 30) | (15, 30) |
| ... | ... | ... | ... | ... |
| CA_103-103 | 103, 103 | (60, 60) | (120, 120) | (240, 240) |
| CA_103-103a | 103, 103 | (60, 60) | (120, 120) | (240, 240) |
| ... | ... | (60, 240) | (120, 240) | (60, 120) |

(b)

| NR CA Band | NR Band | SCS combination for NR CA Band |
|---|---|---|
| CA_1-1 | 1, 1 | same |
| CA_1-1a | 1, 1 | both (same, different) |
| CA_2-2 | 2, 2 | same |
| CA_2-2a | 2, 2 | both (same, different) |
| ... | ... | ... |
| CA_38-38 | 38, 38 | same |
| CA_38-38a | 38, 38 | both (same, different) |
| CA_66-66 | 66, 66 | same |
| CA_66-66a | 66, 66 | both (same, different) |
| ... | ... | ... |
| CA_103-103 | 103, 103 | same |
| CA_103-103a | 103, 103 | both (same, different) |
| ... | ... | ... |

| NR CA Band | NR Band | SCS combination for NR CA Band (SCS#1, SCS#2) [kHz] | | |
|---|---|---|---|---|
| CA_1-3 | 1, 3 | (15, 15) | (30, 30) | - |
| CA_1a-3a | 1, 3 | (15, 15) | (30, 30) | (15, 30) |
| CA_1-5 | 1, 5 | (15, 15) | (30, 30) | - |
| CA_1a-5a | 1, 5 | (15, 15) | (30, 30) | (15, 30) |
| ... | ... | ... | ... | ... |
| CA_1-38 | 1, 38 | (15, 15) | (30, 30) | - |
| CA_1a-38a | 1, 38 | (15, 15) | (30, 30) | (15, 30) |
| ... | ... | ... | ... | ... |
| CA_2-66 | 2, 66 | (15, 15) | (30, 30) | (60, 60) | 
| CA_2a-66a | 2, 66 | (15, 15) | (30, 30) | (60, 60) |
| | | (15, 60) | (30, 60) | (15, 30) |
| ... | ... | ... | ... | ... |
| CA_2a-103a | 2, 103 | (15, 60) | (30, 60) | (15, 120) | (30, 120) |
| ... | ... | ... | ... | ... |

(b)

| NR CA Band | NR Band | SCS combination for NR CA Band |
|---|---|---|
| CA_1-3 | 1, 3 | same |
| CA_1a-3a | 1, 3 | both (same, different) |
| CA_1-5 | 1, 5 | same |
| CA_1a-5a | 1, 5 | both (same, different) |
| ... | ... | ... |
| CA_1-38 | 1, 38 | same |
| CA_1a-38a | 1, 38 | both (same, different) |
| ... | ... | ... |
| CA_2-66 | 2, 66 | same |
| CA_2a-66a | 2, 66 | both (same, different) |
| ... | ... | ... |
| CA_2a-103a | 2, 103 | different |
| ... | ... | ... |

FIG. 4

TERMINAL APPARATUS AND METHOD

TECHNICAL FIELD

Embodiments of the present invention relate to a technique of a terminal apparatus and a method that realize efficient communication.

This application claims priority based on JP 2017-217078 filed on Nov. 10, 2017, the contents of which are incorporated herein by reference.

BACKGROUND ART

3rd Generation Partnership Project (3GPP), a standardization project, has completed standardization of Evolved Universal Terrestrial Radio Access (EUTRA), which has realized high speed communication by employing Orthogonal Frequency Division Multiplexing (OFDM) communication scheme as well as flexible scheduling using a prescribed unit of frequency and time called a resource block. Note that communication employing standardization techniques in EUTRA may be generally referred to as Long Term Evolution (LTE) communication.

3GPP is also studying Advanced EUTRA (A-EUTRA), which realizes higher speed data transmission and has upper compatibility with respect to EUTRA. In EUTRA, a communication system is assumed in which networks includes base station apparatuses having substantially same cell configurations (cell sizes), whereas in A-EUTRA, a communication system is being studied which assumes networks in which base station apparatuses (cells) having different configurations coexist in the same area (heterogeneous wireless network, heterogeneous network).

Furthermore, next generation communication standards of LTE are being studied in 3GPP (NPL 1).

CITATION LIST

Non Patent Literature

NPL 1: "3GPP TR 38.913 v.14.0.0 (2016-10)", 4 Oct. 2016.

SUMMARY OF INVENTION

Technical Problem

In a communication apparatus (terminal apparatus and/or base station apparatus), conventional transmission control may not achieve efficient communication.

An aspect of the present invention, which has been made in view of the above-described respects, is intended to provide a terminal apparatus and a method that enable transmission control in order to efficiently perform communication.

Solution to Problem (1) In order to accomplish the object described above, an aspect of the present invention is contrived to provide the following measures. Specifically, a terminal apparatus according to an aspect of the present invention includes: a receiver configured to receive first information related to query for capability of the terminal apparatus; and a transmitter configured to transmit second information related to the capability of the terminal apparatus, wherein the second information includes third information related to a band combination of operating bands used for carrier aggregation (CA), the band combination supported by the terminal apparatus, and in a case that more than one subcarrier spacings (SCSs) are supported by the terminal apparatus in each of the operating bands, the third information includes fourth information related to a SCS combination that can be applied to the band combination.

(2) A terminal apparatus according to an aspect of the present invention includes: a receiver configured to receive first information related to query for capability of the terminal apparatus; and a transmitter configured to transmit second information related to the capability of the terminal apparatus, wherein the second information includes third information and fourth information, the third information indicates a band combination of operating bands, the band combination supported by the terminal apparatus, the band combination includes a first operating band and a second operating band paired with the first operating band, and the fourth information indicates a subcarrier spacing for downlink and a subcarrier spacing for uplink in the first operating band, and a subcarrier spacing for uplink in the second operating band.

(3) A method according to an aspect of the present invention is a method for a terminal apparatus, the method including the steps of: receiving first information related to query for capability of the terminal apparatus; transmitting second information related to the capability of the terminal apparatus; causing third information related to a band combination of operating bands used for carrier aggregation (CA) to be included in the second information, the band combination supported by the terminal apparatus; and in a case that more than one subcarrier spacings (SCSs) are supported by the terminal apparatus in each of the operating bands, causing fourth information related to a combination of subcarrier spacings (SCSs) that can be applied to the band combination to be included in the third information.

(4) A method according to an aspect of the present invention is a method for a terminal apparatus, the method including the steps of: receiving first information related to query for capability of the terminal apparatus; and transmitting second information related to the capability of the terminal apparatus, wherein the second information includes third information and fourth information, the third information indicates a band combination of operating bands, the band combination supported by the terminal apparatus, the band combination includes a first operating band and a second operating band paired with the first operating band, and the fourth information indicates a subcarrier spacing for downlink and a subcarrier spacing for uplink in the first operating band, and a subcarrier spacing for uplink in the second operating band.

Advantageous Effects of Invention

According to an aspect of the present invention, transmission efficiency can be improved in a wireless communication system in which a base station apparatus and a terminal apparatus communicate with each other.

BRIEF DESCRIPTION OF DRAWINGS

FIG. 1 is a diagram illustrating an example of operating bands according to a first embodiment.

FIG. 2 is a diagram illustrating an example of band combinations of intra-band continuous allocation CA and SCS according to the first embodiment.

FIG. 3 is a diagram illustrating an example of band combinations of intra-band non-continuous allocation CA and SCS according to the first embodiment.

FIG. 4 is a diagram illustrating an example of band combinations of inter-band CA and SCS according to the first embodiment.

DESCRIPTION OF EMBODIMENTS

First Embodiment

Figure 5:
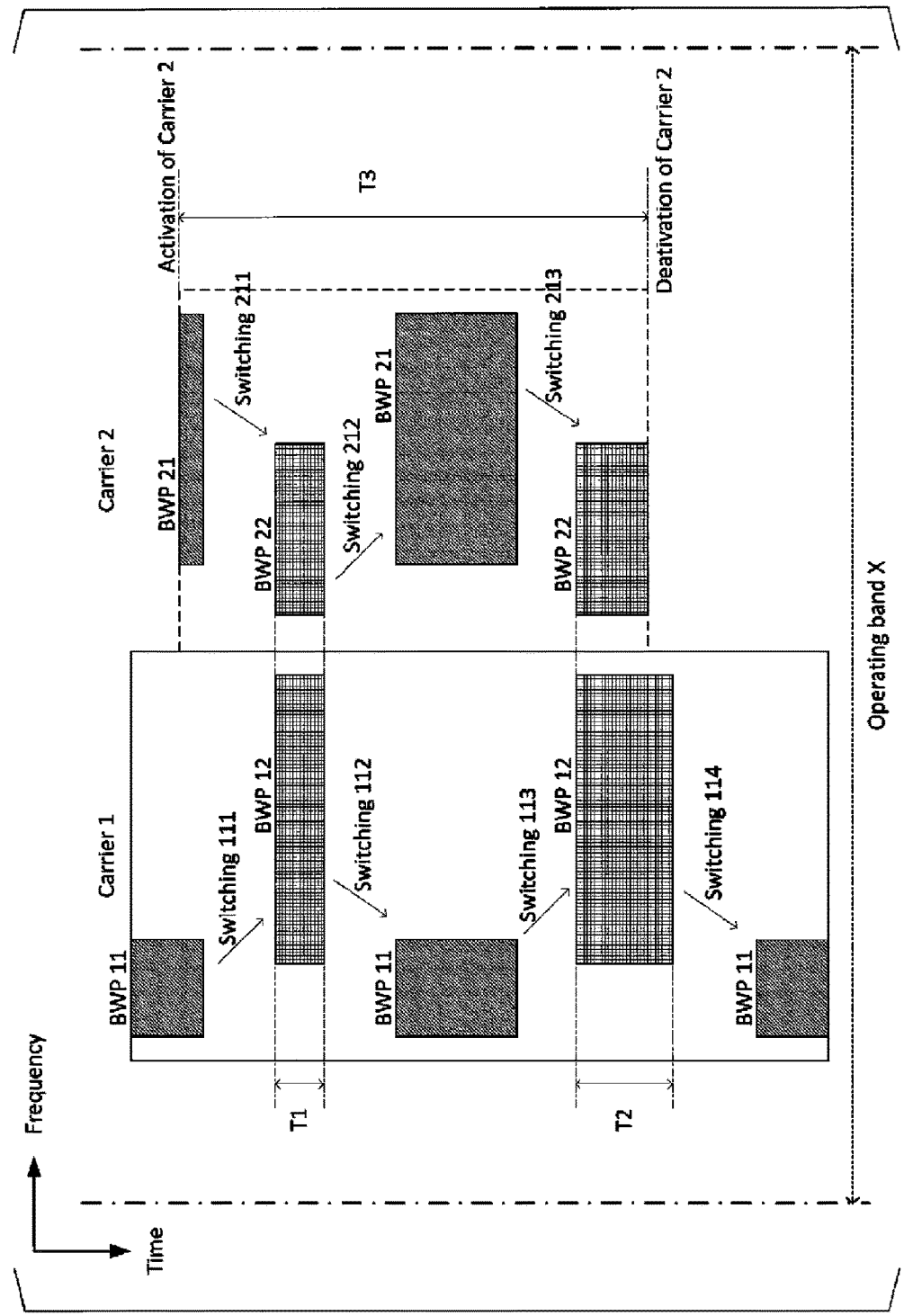
FIG. 5 is a diagram illustrating an example of intra-CA of same SCS combinations including multiple BWPs configured with different SCSs according to the first embodiment.

A first embodiment of the present invention will be described below. Description will be provided referring to a communication system in which a base station apparatus 2 and a terminal apparatus 1 communicate with each other in a cell and/or by using a carrier. Note that the base station apparatus 2 may also be referred to as a base station, a base station apparatus, a node B, an eNB (EUTRAN NodeB, evolved NodeB), or a gNB. The terminal apparatus 1 may also be referred to as a terminal, a terminal apparatus, a mobile station, a user device, or a User equipment (UE).

A cell supporting Next Generation Radio Access Technology (NR) is also referred to as an NR cell or an NR serving cell. A carrier of the NR cell is referred to as an NR carrier. A component carrier of the NR cell is also referred to as an NR component carrier. Note that in the present embodiment, the NR cell, the NR carrier, and the NR component carrier may be referred to as a cell, a serving cell, a carrier, or a component carrier. Here, a cell, a carrier, and a component carrier may be synonymous.

In an NR cell, an NR carrier, and/or an NR component carrier, the length (time length, time period) of a subframe, a slot, a mini-slot, and a symbol may be each specified (defined, configured) based on a time unit $T_s$. Here, a symbol may be a Single Carrier-Frequency Division Multiple Access (SC-FDMA) symbol, or an Orthogonal Frequency Division Multiplexing (OFDM) symbol. A mini-slot may also be referred to as a sub-slot. OFDM may also be referred to as Cyclic Prefix-OFDM (CP-OFDM). SC-FDMA may be Discrete Fourier Transform-Spread-OFDM (DFT-S-OFDM). SC-FDMA is a single carrier and is effective for communication in a cell that has a wide coverage such as a macro cell, whereas OFDM is a multicarrier and is effective for communication in a narrow coverage such as a small cell.

The time unit $T_s$ may correspond to a sampling period (sampling interval, sampling rate) of symbols associated with a certain subcarrier spacing (SCS). In other words, $T_s$ may be a period for sampling time-continuous signals in a certain time period. Here, sampling the time-continuous signals in the certain time period allows time-discrete signals to be obtained. The time-discrete signals may also be referred to as samples or sampling signals. The time-continuous signals may also be referred to as analog signals. The time-discrete signal may also be referred to as digital signals. $T_s$ may be a prescribed value, regardless of the SCS or sampling size.

The $T_s$ may be determined based on the sampling size for time-continuous signals in the certain time period. In other words, the $T_s$ may be interpreted as the time interval between adjacent time-discrete signals. Here, the sampling size may also be referred to as the number of times sampling is performed, the number of sampling points, the sample size, or the number of samples. The sampling size may be determined based on Fast Fourier Transform (FFT) size and/or Inverse FFT (IFFT) size. The sampling size may be expressed as the power of 2. An available channel bandwidth may be determined based on the sampling size. Here, in a case that the certain time period corresponds to the SCS, the certain time period may be expressed as the reciprocal of the SCS. In a case that one or more time-discrete signals are generated in the certain time period, a sequence may be generated by using the time-discrete signals. The sequence may also be referred to as time-series signals. The certain time period may also be referred to as the symbol length for the time-continuous signals. The certain time period may also be referred to as the symbol duration for the time-discrete signals. The certain time period may also be referred to as the sequence length for the time-series signals. The time-continuous signals and/or time-discrete signals and/or time-series signals in the certain time period are also referred to as symbols. The symbols may be added with Cyclic Prefix (CP), which is equivalent with a guard duration, in order to reduce inter-symbol interference or corresponding inter-subcarrier interference. A duplicate of time-continuous signals and/or time-discrete signals in a part of the certain time period may be used for the CP. The CP may be identical to time-continuous signals and/or time-discrete signals in a part of the certain time period. The time length for the CP may also be referred to as a CP length for the time-continuous signals. The time length for the CP may also be referred to as a CP duration for the time-discrete signals. In the present embodiment, a symbol length may be synonymous with a symbol duration or a sequence length. A CP length may be synonymous with a CP duration.

Letting N be the number of samples in the certain time period, that is, the sampling size in a certain symbol, the symbol length may be expressed as $N*T_s$. Letting $N_{CP,1}$ be the sampling size in the CP length, the CP length may be expressed as $N_{CP,1}*T_s$. The sampling size in the CP length may be individually specified and/or configured according to symbol numbers. Hereinafter, a symbol including CP may be simply referred to as a symbol. In other words, the length of a single symbol may be specified as $(N_{CP,1}+N)*T_s$. The value of $N_{CP,1}$ may be determined based on the number of the symbol to which CP is added. The value of $N_{CP,1}$ may also be determined based on the type of CP. For example, types (classification) of CP include Normal CP (NCP) and Extended CP (ECP), which has a longer CP length than that of NCP. Note that ECP may be supported in specific SCSs.

The channel bandwidth may be associated with the bandwidth of the carrier, the bandwidth of the Bandwidth Part (BWP), the system bandwidth, the maximum transmission bandwidth, the maximum reception bandwidth, the maximum measurement bandwidth, and the total number of available subcarriers. The channel bandwidth may also be specified for each operating band. In other words, supported channel bandwidths may vary according to operating bands. For example, in a case that there are five types of channel bandwidths, a first operating band may support first to third channel bandwidths, and need not support fourth and fifth channel bandwidths. A second operating band may support first to fifth channel bandwidths. Here, an operating band may specify a range of carrier frequencies available for each of downlink carriers and uplink carriers. Available channel bandwidths or system bandwidths may be specified based on the range of available carrier frequencies. A terminal apparatus and a base station apparatus support at least one operating band. Whether multiple operating bands are supported or not may be based on the capability of the terminal apparatus and/or the capability of the base station apparatus. An operating band may be associated with an available duplexing mode. The larger the sampling size in the certain time period is, the wider the supported channel bandwidth may become. For example, channel bandwidths up to 20 MHz may be supported in a case that the sampling size is 2048 for 15 kHz SCS corresponding to the certain time period, and channel bandwidths up to 40 MHz may be supported in a case that the sampling size is 4096 for 15 kHz SCS corresponding to the certain time period.

One or more SCSs may be specified or used for a single operating band. For example, transmission and reception using physical channels and/or physical signals with SCS of 15 kHz, and/or 30 kHz, and/or 60 kHz may be supported for a first operating band index. Transmission and reception using physical channels and/or physical signals with SCS of 15 kHz may be supported for a second operating band index. Transmission and reception using physical channels and/or physical signals with SCS of 120 kHz, and/or 240 kHz, and/or 480 kHz may be supported for a third operating band index. Note that applicable ranges of carrier frequencies supported by each of the first operating band index and the third operating band index may be different. Note that operating band indexes and applicable ranges of carrier frequencies may be associated in advance. An operating band index may simply be referred to as an operating band.

Next, details of operating bands (NR operating bands) according to the present embodiment will be described.

FIG. 1 is a diagram illustrating an example of operating bands and parameters related to the operating bands according to the present embodiment. For example, the parameters may include at least one or all of an uplink operating band, a downlink operating band, a duplex mode, and a subcarrier spacing (SCS).

An uplink operating band indicates a range of carrier frequencies (carrier frequency band, minimum carrier frequency, and maximum carrier frequency) of carriers (i.e., a serving cell for the carriers) used for reception of a base station apparatus and transmission of a terminal apparatus, related to the operating band.

A downlink operating band indicates a range of carrier frequencies (carrier frequency band, minimum carrier frequency, and maximum carrier frequency) of carriers (i.e., a serving cell for the carriers) used for transmission of a base station apparatus and reception of a terminal apparatus, related to the operating band.

A duplex mode indicates Time Division Duplex (TDD) or Frequency Division Duplex (FDD). Note that in TDD, uplink transmission and downlink transmission are separated in the time domain. In FDD, uplink transmission and downlink transmission are separated in the frequency domain.

SCS indicates SCS to be used for transmission and/or reception (uplink transmission and downlink transmission) supported in the operating band. Supported SCS may basically be the same in uplink and downlink. Note that in a case that carrier frequencies of the uplink operating band and carrier frequencies of the downlink operating band are significantly separated (for example, the operating band 81 illustrated in FIG. 1), the supported SCS may have different values in the uplink and the downlink.

Operating bands may be managed by using indexes and tables in accordance with carrier frequency bands supported by the uplink operating band and the downlink operating band, duplex modes, and SCS. Depending on indexes of operating bands, a terminal apparatus may know carrier frequency bands (range of carrier frequencies) included in each of the uplink operating band and the downlink operating band, an applicable duplexing mode, and an applicable SCS.

The values of uplink operating bands, downlink operating bands, duplex modes, and subcarrier spacings (SCSs) corresponding to operating bands illustrated in FIG. 1 are examples, and may be defined by other values.

Whether the same SCS is applied or SCSs are configured individually in the uplink (or uplink cell) and the downlink (or downlink cell) included in one serving cell corresponding to one operating band, as illustrated in FIG. 1, may be determined based on higher layer parameters. For example, in a case that SCS for uplink is configured as a higher layer parameter, SCSs are configured individually in the uplink and the downlink. In a case that only one higher layer parameter related to SCS configuration for the serving cell is configured or in a case that higher layer parameters related to SCS configuration for the uplink of the serving cell are not configured, SCS may have the same value in the uplink and the downlink. Note that in a case that the uplink and the downlink only support different SCSs as in the operating band 81 in FIG. 1, SCSs may be configured individually by using higher layer parameters individually in the uplink and the downlink. In other words, higher layer parameters related to SCS configuration may be configured for each of the uplink and the downlink. SCS configuration may be (for example, $\mu=0, 1, \ldots, 5$). SCS based on SCS configuration may be defined as $15*2^\mu[kHz]$.

Although multiple SCSs are supported in FIG. 1, in a case that a terminal apparatus supports only one of the SCSs, information related to the SCS supported by the terminal apparatus may be notified as capability information to a base station apparatus. In a case that SCSs supported by a terminal apparatus are different depending on operating bands, information related to operating bands and SCSs supported for the operating bands may be notified as capability information to a base station apparatus.

The terminal apparatus and the base station apparatus may not support communication (transmission and/or reception) for all operating bands illustrated in FIG. 1. The terminal apparatus may transmit information related to operating bands supported by the terminal apparatus as capability information to the base station apparatus. The base station apparatus may also query whether the terminal apparatus supports the operating bands supported by the base station apparatus or not. The terminal apparatus may transmit information indicating that the terminal apparatus supports the operating bands queried by the base station apparatus as capability information to the base station apparatus.

Next, band combinations and SCS combinations in carrier aggregation (CA) according to the present embodiment will be described.

CA is a technique for aggregating multiple carriers to perform uplink transmission and/or downlink transmission. CA may also be referred to as cell aggregation, as it involves aggregating multiple cells (serving cells) to communicate. In CA, a cell operating a first frequency for a terminal apparatus to perform an initial access procedure or an initial connection establishment procedure may be referred to as a primary cell, and a cell added by the primary cell may be referred to as a secondary cell. A primary cell is always activated, and a secondary cell may be activated and/or deactivated.

FIG. 2 is a diagram illustrating an example of operating bands that can be continuously allocated in intra-band CA and combinations of SCSs that can be applied to two carriers of the operating bands according to the present embodiment. Note that intra-band CA is CA performed by using at least two carriers in the same operating band. In intra-band CA of continuous allocation, at least two carriers are continuously allocated (that is, adjacent to each other) in the frequency domain of one operating band.

FIG. 3 is a diagram illustrating an example of operating bands that can be non-continuously allocated in intra-band CA and combinations of SCSs that can be applied to two carriers of the operating bands according to the present embodiment. In non-continuous allocation, two carriers are non-continuously allocated (i.e., not adjacent to each other) in the frequency domain.

FIG. 4 is a diagram illustrating an example of combinations of operating bands in inter-band CA and combinations of SCSs that can be applied in the combinations according to the present embodiment. Note that in inter-band CA, CA is performed in different operating bands. For example, in a case that the terminal apparatus supports CA_1-3, it indicates that the terminal apparatus is capable of CA using carriers of an operating band 1 and carriers of an operating band 3, which are different operating bands. SCS combinations described in FIG. 4 indicate combinations of SCSs that can be applied to carriers of a first operating band and carriers of a second operating band.

Here, in FIG. 2, FIG. 3, and FIG. 4, NR CA Band is indexes (information, numbers) corresponding to combinations of operating bands to which CA can be applied. NR Band indicates combinations of operating bands corresponding to the indexes. Combinations of operating bands to which carriers used for CA belong may be referred to as band combinations. SCS combinations indicate combinations of SCSs that can be applied to the band combinations. That is, SCS combinations indicate combinations of SCS applicable to carriers of a first operating band and SCS applicable to carriers of a second operating band, which are band combinations. Note that in the present embodiment, applicable may include meanings of and be translated into available or configurable.

Note that band combinations of intra-band CA indicate operating bands capable of CA. Band combinations in inter-band CA indicate band combinations capable of CA using carriers of different operating bands.

FIG. 2(a), FIG. 3(a), and FIG. 4(a) illustrate examples of specific SCS combinations, and FIG. 2(b), FIG. 3(b), and FIG. 4(b) illustrate whether only combinations of the same SCS (SCS having the same value) are applicable between two carriers (that is, same), only combinations of different SCSs (SCS having different values) are applicable (that is, different), or both combinations of the same SCS and different SCSs are available (that is, both).

Here, the same SCS combinations are SCS combinations in which values of SCSs that can be applied to two carriers in a certain band combination are the same value, such as (15, 15) and (30, 30). In a case that a terminal apparatus performs CA for a band combination of a same SCS combination, the terminal apparatus may not assume that different SCSs are configured for a carrier of a first operating band and a carrier of a second operating band included in the band combination. In an operating band of a same SCS combination, SCS for the uplink and the downlink may be SCS having the same value. Note that in a case that configuration of SCS is enabled in each of the uplink and the downlink, based on higher layer parameters, SCSs may be configured individually in the uplink and the downlink in the operating band. However, the same SCS is configured for the two carriers.

Different SCS combinations are SCS combinations in which values of SCSs that can be applied to two carriers in a certain band combination can apply different values, such as (15, 30) and (15, 60).

While FIG. 2, FIG. 3, and FIG. 4 illustrate examples of band combinations and SCS combinations in CA using two carriers, band combinations and SCS combinations applied to the band combinations may be indicated in the same manner in CA using three or more carriers.

In FIG. 2, FIG. 3, and FIG. 4, in a case that one type of SCS is supported in one operating band among multiple operating bands included in band combinations (for example, 15 kHz only), the SCS combination for the band combination including the operating band may be a combination that necessarily includes the one type. For example, in a case that the SCS supported by the operating band A is only 15 kHz and the SCS supported by the operating band B is 15 kHz, 30 kHz, and 60 kHz, the SCS combination for the band combination of the operating band A and the operating band B may include at least one of (15, 15), (15, 30), and (15, 60). In this case, for a band combination that supports only the same SCS combination, only (15, 15) is applicable as the SCS combination. That is, the SCS combination may be given based on the type of SCS supported in the operating band in the band combination.

Note that an SCS combination that can be applied to a band combination may be given by information indicating SCS supported by the terminal apparatus in each of operating bands in which CA is not configured (for example, SCS in FIG. 1), and information related to the band combination.

Note that SCS values described in SCS combinations may be applied to physical channels and/or physical signals other than SS blocks and/or the PRACH in at least an initial access procedure. SCS for SS blocks and/or the PRACH in at least an initial access procedure may be defined not based on SCS described in FIGS. 1 to 4. Note that SCS for SS blocks and/or the PRACH used other than initial access procedures may be configured based on the SCSs described in FIGS. 1 to 4.

Although FIG. 2 describes an example in which different SCS combinations are applied, the same SCS combination may always be applied depending on the capability of the terminal apparatus and/or the base station apparatus in intra-band CA of continuous allocation.

In FIG. 4(a) or FIG. 4(b), in a case that CA is performed by using two carriers (i.e. the carrier of the operating band 1 and the carrier of the operating band 3) in the operating band of CA_1-3, in which only the same SCS combination is supported, the SCS to be applied to each carrier may be determined based on one SCS configuration. In a case that CA is performed by using two carriers in CA_1a-3a, which only allows for different SCS combinations, the SCS configuration may be set for each carrier. Note that the SCS configuration includes at least a parameter used to determine the value of SCS. Note that, although examples in which only same SCS combinations are applied are described in band combinations of inter-band CA, basically, both of same SCS combinations and different SCS combinations (i.e., both described in FIG. 4 (b)) may be applied in band combinations of inter-band CA. In a case that only different SCSs are supported between operating bands, such as CA_1a-103a, the SCS combination for the band combination may always be individually configured. That is, in FIG. 4(b), different may always be applied.

Note that SCS in FIGS. 1 to 4 may be defined by a value of pi of the SCS configuration.

In the present embodiment, CA may include at least one of intra-band CA and/or inter-band CA. In other words, in the present embodiment, performing CA may include performing at least one of intra-band CA and/or inter-band CA.

In band combinations of CA, in a case that a supported SCS combination only includes SCS of the same value (or same), the SCS or the numerology may be configured as a parameter common to cells (i.e., between multiple cells) or a parameter unique to a terminal apparatus. Note that the parameter common to cells or the parameter unique to a terminal apparatus may be configured via system information or common higher layer signaling. In a case that a supported SCS combination includes different values (or, both or different in FIG. 2(b), FIG. 3(b), and FIG. 4(b)), the SCS or the numerology may be configured as a parameter for each cell. Note that the parameter for each cell may be configured via system information, common higher layer signaling, or individual higher layer signaling.

That is, in a case that the terminal apparatus performs CA, the SCSs of all corresponding carriers can be changed by changing one SCS configuration for the same SCS combinations, and in a case of including different SCS combinations, the SCS of one corresponding carrier can be changed by changing one SCS configuration.

Note that the SCSs illustrated in FIG. 1 are SCSs supported by terminal apparatuses in operating bands in a case that carrier aggregation is not configured.

In the present embodiment, a terminal apparatus may transmit, as capability information, information related to a band combination indicating a first operating band and a second operating band paired with the first operating band, and information indicating the SCS for the downlink and the SCS for the uplink in the first operating band and the SCS for the uplink in the second operating band, to a base station apparatus. The information indicating the SCS for the downlink and the SCS for the uplink in the first operating band and the SCS for the uplink in the second operating band may include information indicating the SCS for the downlink in the second operating band.

Note that in a case that a terminal apparatus supports both of same SCS combinations and different SCS combinations for all operating bands and/or band combinations supported by the terminal apparatus, the terminal apparatus may transmit information indicating that both of the same SCS combinations and the different SCS combinations are supported to a base station apparatus as capability information.

Next, a case that one or more Bandwidth Parts (BWP) are configured for one serving cell corresponding to one carrier will be described according to the present embodiment.

A BWP may be a set of physical resources allocated sequentially in one carrier. The BWP may be selected from subsets allocated sequentially in the frequency domain of one carrier. In other words, the bandwidth corresponding to the BWP may be configured to be narrower than or equal to the bandwidth of the carrier (serving cell or cell). The bandwidth configured to the BWP may be configured according to frequency characteristics of filters used for transmission and/or reception of the terminal apparatus.

Information related to filters of the terminal apparatus may be notified to a base station apparatus as capability information. The number of BWPs configured to one carrier may be one or multiple. In a case that multiple BWPs are configured to one carrier, one BWP is activated in one carrier. The terminal apparatus expects that an uplink BWP and a downlink BWP are simultaneously activated in one carrier, but it is not expected that more than one uplink BWPs/downlink BWPs are simultaneously activated.

In a case that a BWP is configured, the terminal apparatus does not assume that the PDSCH or the PDCCH is received outside of the activated BWP (active BWP). In a case that a BWP is configured, the terminal apparatus does not assume that the PUSCH or the PUCCH is transmitted outside of the activated BWP. In other words, the terminal apparatus may not assume that at least the PDSCH/PDCCH/PUSCH/PUCCH is mapped outside of the BWP (the bandwidth of the BWP based on BWP configuration) via DCI format (uplink grant and/or downlink grant) or higher layer parameters. The terminal apparatus may receive the PDSCH/PDCCH or transmit the PUSCH/PUCCH within the bandwidth of the active BWP. DMRSs corresponding to the PDSCH/PDCCH/PUSCH/PUCCH may be transmitted within the active BWP.

In a case that multiple BWPs are configured, one of the multiple BWPs may be configured as a default BWP or an initial active BWP. The default BWP or the initial active BWP may be a BWP that is activated at the same time when the carrier is activated. The default BWP and/or the initial active BWP may be configured with a CORESET including a specific search space. The default BWP or the initial active BWP may be configured with an SS block.

In FIG. 1, in a case that multiple SCSs are supported in a certain operating band and that multiple BWPs are configured in a carrier of the operating band, SCS may be configured for each BWP.

In a case that multiple BWPs are configured for one serving cell corresponding to one carrier and that CA in band combinations including only same SCS combinations is performed (for example, CA is performed in CA_1 in FIG. 2, CA_1-1 in FIG. 3, or CA_1-3 in FIG. 4), SCS may not be configured for each BWP. That is, dynamic SCS changes may not be made based on dynamic switching of BWP.

In a case that multiple BWPs are configured for one serving cell corresponding to one carrier and in a case that CA in a band combination including different SCS combinations is performed (for example, CA is performed in CA_1a in FIG. 2, CA_1-1a in FIG. 3, or CA_1a-3a in FIG. 4), SCS may be configured for each BWP. That is, dynamic SCS changes may be made by dynamically switching BWP for a certain serving cell. For example, in a case that BWP indication information is included in DCI format, switching of BWP can be performed dynamically.

FIG. 5 is a diagram illustrating an example of intra-CA of same SCS combinations including multiple BWPs configured with different SCSs according to the present embodiment. The patterns of BWPs (for example, diagonal lines and lattice pattern) in FIG. 5 indicate values of SCS configured to the BWPs (for example, 15 kHz or 30 kHz). In other words, BWPs with the same pattern indicate that the same SCS (SCS with the same value) is configured even in different BWPs.

FIG. 5 is a diagram illustrating an example of intra-CA of same SCS combinations including multiple BWPs configured with different SCSs according to the present embodiment. The patterns of BWPs (for example, diagonal lines and lattice pattern) in FIG. 5 indicate values of SCS configured to the BWPs (for example, 15 kHz or 30 kHz). In other words, BWPs with the same pattern indicate that the same SCS (SCS with the same value) is configured even in different BWPs.

A carrier 1 and a carrier 2 correspond to a cell 1 and a cell 2, respectively. The BWP11 and the BWP12 are BWPs for the carrier 1, and SCSs are configured to different values. The BWP21 and the BWP22 are BWPs for the carrier 2, and SCSs are configured to different values. The BWP11 and the BWP21 are configured with SCS of the same value, and the BWP12 and the BWP22 are configured with SCS of the same value.

In the carrier 1, in a case that the BWP11 is activated, activation of the carrier 2 activates the BWP21 configured with the same SCS as the BWP11. In a case that the terminal apparatus satisfies a first condition and switches the active BWP on the carrier 1 from the BWP11 to the BWP12 (switching 111), the active BWP on the carrier 2 also switches from the BWP21 to the BWP22 configured with the same SCS as the BWP12 (switching 211). In a case that the terminal apparatus satisfies a second condition and switches the active BWP on the carrier 1 from the BWP12 to the BWP11 (switching 112), the active BWP on the carrier 2 switches from the BWP22 to the BWP21 (switching 212). In a case that the terminal apparatus satisfies a third condition and switches the active BWP on the carrier 1 from the BWP11 to the BWP12 (switching 113), the active BWP on the carrier 2 switches from the BWP21 to the BWP22 (switching 213). In a case that a fourth condition is satisfied, the terminal apparatus switches the active BWP on the carrier 1 from the BWP12 to the BWP11 (switching 114).

T1 and T2 indicate activation periods of the BWP12. In FIG. 5, T1 and T2 are expressed as different lengths, but in a case that the second condition and the fourth condition are the same conditions, T1 and T2 may be the same length. For example, in a case that the second condition and the fourth condition are both expiration of a deactivation timer for the BWP12, T1 and T2 may be the same length.

In FIG. 5, the BWP11 and the BWP21 may be configured as a default BWP for a corresponding carrier.

In FIG. 5, in a case that BWPs (denoted here as a BWP13 and a BWP23 in order to distinguish) configured with the same SCS as the BWP11 and BWP21, the default BWP for the corresponding carrier may be configured based on higher layer parameters.

FIG. 5 is described without distinction of uplink and downlink, but the present invention may be applied to any one of the uplink and the downlink. For example, the uplink may perform BWP switching with same SCS combinations, but the downlink may be capable of BWP switching individually.

FIG. 5 illustrates an example of intra-band CA of continuous allocation, but in a case of same SCS combinations, similar processes may be performed in intra-band CA or inter-band CA of non-continuous allocation.

The first condition to the fourth condition may include at least one of the following (Z0) to (Z3). By satisfying any one of the first condition to the fourth condition, the active BWP may be switched to a preconfigured default BWP or an initial active BWP.

(Z0) Change in active BWP based on active BWP indication information
(Z1) Expiration of deactivation timer for active BWP
(Z2) Expiration of PDCCH monitoring period in active BWP
(Z3) Detection of prescribed number of Out Of Sync (OOS) in active BWP The active BWP indication information is used to switch the active BWP on a carrier in a case that multiple BWPs are configured for one carrier. Note that the active BWP indication information may be configured via DCI format or MAC CE.

The deactivation timer for an active BWP is a timer that is used to switch to a default BWP or an initial active BWP after a prescribed period of time has elapsed. Until the timer expires, the terminal apparatus may receive the PDCCH/PDSCH or transmit the PUSCH/PUCCH in the BWP indicated activation.

The terminal apparatus transmits an OOS indication for a BWP from L1 to higher layers in a case that the radio link quality of the BWP (for example, the measurement value of the DLRS/SS block or the received power of the PDCCH) is less than a prescribed threshold. That is, the OOS may be used to indicate the radio link quality of the BWP.

Next, subframes according to the present embodiment will be described. The length (time length, time period) of a subframe according to the present embodiment may be 1 ms. The SCS corresponding to the subframe length may be 15 kHz. In other words, the number of symbols constituting a single subframe may be specified based on the 15 kHz SCS. For example, the number of symbols constituting a single subframe may be specified taking into account the CP length and the symbol length. For example, the number of symbols constituting a single subframe may be 14 symbols in a case of NCP. In order to support the 1 ms subframe length, the symbol length of particular symbols including CP may differ from that of other symbols including CP. Lengths of CP added in particular symbols may be different. A subframe may include one or more slots, and/or one or more mini-slots, and/or one or more symbols. The number of slots and/or mini-slots included in one subframe may be determined based on SCS configuration applied to the slots and/or the mini-slots.

Here, the number of symbols included in a single subframe may be specified based on SCSs for physical channels used for transmission and/or reception. For example, in a case that the SCS is 15 kHz, the number of symbols included in a single subframe may be 14. In a case that the SCS is 30 kHz, the number of symbols included in a single subframe may be 28. The number of symbols included in a single subframe may be assumed by the terminal apparatus by detecting a particular physical channel and/or a particular physical signal, or by identifying SCS for a particular physical channel and/or a particular physical signal. In other words, the terminal apparatus may assume the number of symbols included in a single subframe by performing subcarrier synchronization and symbol synchronization. The number of symbols included in a single subframe may be specified as a default value for the terminal apparatus. For example, the number of symbols included in a single subframe may be specified in association with the operating band. In other words, in order to camp on a cell and/or capture (detect) a cell which belongs to a carrier frequency of a certain operating band, the terminal apparatus may assume the number of symbols included in a single subframe based on the certain operating band. In other words, the terminal apparatus may, based on the assumption, receive and/or detect a particular physical channel and/or a particular physical signal to be broadcast. The terminal apparatus may perform time-frequency synchronization, based on the assumption. The terminal apparatus may perform an initial connection establishment procedure and/or a connection re-establishment procedure and/or a handover procedure, based on various configurations and/or parameters indicated by the particular physical channel and/or the particular physical signal. The initial connection establishment procedure may include an initial access procedure. The initial access procedure, the connection re-establishment procedure, and the handover procedure may include a random access procedure.

Here, common higher layer signaling may refer to signaling including a higher layer parameter which is configured as a common value and/or a same value among terminal apparatuses in a same cell. Individual higher layer signaling may refer to signaling including higher layer parameters which are individually configured for terminal apparatuses in a same cell.

Here, the common physical layer signaling may refer to signaling including a physical layer parameter which is configured as a common value and/or a same value among terminal apparatuses in a same cell. Individual physical layer signaling may refer to signaling including physical layer parameters which may be individually configured for terminal apparatuses in a same cell. The physical resources to which common physical layer signaling is mapped may be identical among terminal apparatuses in a same cell. The physical resources to which individual physical layer signaling is mapped may be different between terminal apparatuses in a same cell.

In a case that information for indicating a configuration relating to a slot and a mini-slot has not been broadcast in the cell, the terminal apparatus may transmit and receive a particular physical channel and/or a particular physical signal, based on various configurations relating to the subframe, until various parameters relating to the slot and the mini-slot are configured. In a case that a default value relating to a slot and a mini-slot described below has not been configured in the terminal apparatus, the terminal apparatus may transmit and receive a particular physical channel and/or a particular physical signal, based on various configurations relating to the subframe, until various parameters relating to the slot and the mini-slot are configured. In a case that a default value relating to a slot and a mini-slot described below has not been configured in the terminal apparatus, and information for indicating a configuration relating to a slot and a mini-slot has not been broadcast in the cell, the terminal apparatus may transmit and receive a particular physical channel and/or a particular physical signal based on various configurations relating to the subframe until various parameters relating to the slot and the mini-slot are configured.

The terminal apparatus may transmit and/or receive various physical channels and/or physical signals, based on parameters relating to the subframe until a parameter relating to the slot and/or the mini-slot is configured. Here, the parameters relating to the subframes may include SCS, the number of symbols constituting a single subframe, the length of a single symbol, and/or the length of a single CP.

In a case that information for indicating a configuration relating to a slot and a mini-slot has been broadcast in a cell, the terminal apparatus may transmit and receive a particular physical channel and/or a particular physical signal, based on the information for indicating the configuration relating to the slot and the mini-slot.

In a case that a default value relating to a slot and a mini-slot described below has been configured in a terminal apparatus, a particular physical channel and/or a particular physical signal may be transmitted and received, based on the default value. On this occasion, the terminal apparatus may perform transmission and reception through some physical channels and/or physical signals other than a particular physical channel and/or a particular physical signal, based on various configurations relating to the subframe.

In a case that a default value relating to a slot and a mini-slot described below has been configured in a terminal apparatus, and information for indicating a configuration relating to the slot and the mini-slot has been broadcast in a cell, the terminal apparatus may transmit and receive a particular physical channel and/or a particular physical signal, based on the broadcast information for indicating the configuration relating to the slot and the mini-slot. The terminal apparatus may perform transmission and reception through some physical channels and/or physical signals other than a particular physical channel and/or a particular physical signal, based on the default value. The terminal apparatus may perform transmission and reception through some physical channels and/or physical signals other than a particular physical channel and/or a particular physical signal, based on various configurations relating to the subframe.

Multiple physical channels and/or multiple physical signals may be mapped in a single subframe. For example, a downlink physical channel and an uplink physical channel may be mapped in a single subframe. Only physical channels and physical signals relating to downlink may be mapped in a single subframe. Only physical channels and physical signals relating to uplink may be mapped in a single subframe. The downlink physical channels and uplink physical channels may be specified and/or configured with different numbers of symbols. In a case that downlink physical channels and uplink physical channels can be mapped in a same subframe, it is preferable that the downlink physical channels and the uplink physical channels are mapped to different symbols (different symbol numbers). In a case that reception of downlink physical channel is switched to transmission of uplink physical channel in a terminal apparatus, a gap may be specified and/or configured as a switching point or a switching period. The length of each symbol in the subframe to be specified may correspond to a symbol number. For example, the symbol length may vary depending on the symbol number.

A subframe may be used as a unit of transmission and/or a unit of reception of a particular physical channel and/or a particular physical signal. For example, a subframe may be used to indicate a transmission period or a reception period of a particular physical channel and/or a particular physical signal. A subframe may also be used to indicate a time interval for a particular process or a particular procedure. Here, the particular physical channel may refer to a physical channel including a particular piece of information. The particular physical signal may refer to a physical signal transmitted for a particular purpose. For example, the particular physical signal may refer to a signal transmitted for performing time-frequency synchronization. The particular physical signal may refer to a signal transmitted for allocating or managing physical resources. The particular physical signal may refer to a signal transmitted for measuring a channel state. Here, the channel state may be relating to the quality or power of the channel, the arrival angle, or the number of beams or layers.

Next, a slot according to the present embodiment will be described. The slot may include one or more mini-slots and/or one or more physical channels and/or one or more symbols. The length (length of time) of a single slot may be specified based on the number of symbols constituting a single slot, the length of a single symbol, or the length of a CP added to the single symbol. The length of the single symbol and the length of the single CP may be specified in relation to the SCS applied to the slot. In other words, the length of the symbol and the CP used in the slot may be configured or specified independently of the subframe.

Here, the number of symbols constituting a single slot may be specified based on the SCS used in the configuration of the slot. For example, the number of symbols constituting a single slot may be 7 symbols or 14 symbols in a case that the SCS is up to 60 kHz. The number of symbols constituting a single slot may be 14 symbols in a case that the SCS exceeds 60 kHz. The number of symbols constituting a single slot may be configured independently of the number of symbols constituting a single subframe. Note that the number of symbols constituting a single slot may be 14 symbols regardless of SCS (and/or numerology). For example, the number of symbols constituting a single slot may be configured via common and/or individual higher layer signaling. The number of symbols constituting a single slot may be configured via the common and/or individual physical layer signaling.

In a case that more than one slot is included in a single subframe for a terminal apparatus, the number of symbols constituting each slot in the subframe may be a common or same number. In a case that more than one slot is included in a single subframe for a terminal apparatus, the number of symbols constituting each slot in the subframe may be individually configured. In a case that more than one slot are included in a single subframe for a terminal apparatus, the number of symbols constituting each slot in the subframe may be specified based on the SCS corresponding to each slot. In a case that slot aggregation which causes multiple slots to be time-multiplexed, and transmitted and/or received is applied to a certain terminal apparatus, the number of symbols constituting each slot in the slot aggregation may be a common or same number. Multiple physical channels and/or multiple physical signals may be mapped in the multiple slots that are time-multiplexed. A single channel may be mapped in the multiple slots that are time-multiplexed.

Multiple physical channels and/or multiple physical signals may be mapped in a single slot. In other words, a slot may specify one or more physical channels, and/or a time-frequency domain in which one or more physical signals are mapped, and/or physical resources. For example, a downlink physical channel and an uplink physical channel may be mapped in a single slot. The downlink physical channel and the uplink physical channel mapped in a single slot may be specified and/or configured with different numbers of symbols. In a case that the downlink physical channel and the uplink physical channel can be mapped in a same slot of a same carrier frequency, the downlink physical channel and the uplink physical channel may be mapped to different symbols (different symbol numbers). In other words, the downlink physical channel and the uplink physical channel mapped in a single slot are mapped by Time Domain Multiplexing (TDM). In a case that reception of the downlink physical channel is switched to transmission of the uplink physical channel in the terminal apparatus, a gap may be specified and/or configured as a switching point or a switching period. In a case that the downlink physical channel and the uplink physical channel can be mapped in a single slot, the length of the symbol used respectively for the downlink physical channel and the uplink physical channel and the length of the CP added thereto may be common. However, in a case that the length of CP corresponds to the symbol number, the length of CP may vary between the downlink physical channel and the uplink physical channel. Here, a CP may be added according to the number of the symbol to which the CP is added. In other words, there may be a CP of a same length between symbol numbers, and a CP of a particular length to be added for a particular symbol number. The CP of the particular length to be added may be referred to as an extra CP. The length of the extra CP may be specified based on the SCS corresponding to the symbol to be added. The extra CP may be added to a mini-slot described below in a similar manner. For example, the extra CP may be inserted at an interval of 0.5 ms. In other words, the extra CP may be inserted into corresponding symbols every 0.5 ms. In other words, the extra CP may be inserted into a corresponding symbol or symbol number at a prescribed time interval. The extra CP may be inserted for each seven symbols (seventh symbol number). For a corresponding symbol number, the extra CP and the NCP may be considered to be a single CP. In other words, the length of the CP added to a corresponding symbol number may be different from the length of the CP added to another symbol number.

It is preferable that a slot and a physical channel and/or physical signal mapped in the slot are not mapped on the subframe boundary (between adjacent subframes).

Next, a mini-slot according to the present embodiment will be described. The mini-slot may include one or more symbols. The length (length of time) of a single mini-slot may be specified based on the number of symbols constituting a single mini-slot, the length of a single symbol, and the length of a single CP to be added to the single symbol. The length of the single symbol and the length of the single CP may be specified in relation to the SCS applied to the mini-slot. In other words, the length of the symbol and the CP used for the mini-slot may be configured or specified independently of the subframe or the slot.

Here, the number of symbols constituting a single mini-slot may be smaller than the number of symbols constituting the slot. The number of symbols constituting a single mini-slot may be specified or configured based on the number of symbols constituting a single slot. The number of symbols constituting a single mini-slot may be configured independently of the number of symbols constituting a single slot. For example, the number of symbols constituting a single mini-slot may be configured via common and/or individual higher layer signaling. The number of symbols constituting a single mini-slot may be configured via common and/or individual physical layer signaling. In a case that more than one single mini-slot can be included in the subframe, the number of symbols constituting a single mini-slot between mini-slots included in a single subframe is preferably a common or same number at least in the single subframe. The number of symbols constituting a single mini-slot may be specified in relation to the SCS applied or configured for the mini-slot.

A single physical channel and/or a single physical signal may be mapped in a single mini-slot. For example, in a mini-slot, a single physical channel and a physical signal for demodulating the physical channel may be mapped. In other words, the mini-slot may specify a time-frequency domain or a physical resource in which a single physical channel and/or a single physical signal is mapped. In a case that the terminal apparatus supports the capability of simultaneously transmitting and/or receiving multiple mini-slots, physical channels and/or physical signals may individually be mapped for each mini-slot. The mini-slot may be configured only in a case that the slot is configured. The mini-slot and the slot may be coexisting in a single subframe. In a case that the slot and the mini-slot are individually configured, the terminal apparatus and/or the base station apparatus may simultaneously transmit and/or receive the slot and the mini-slot, or the physical channel and the physical signal allocated to each of the slot and the mini-slot. Whether to allow simultaneous transmission and reception of different mini-slots to be performed in a single subframe of a single cell may be determined based on the capability supported by the terminal apparatus. Here, "individually configured" may include the meaning that related parameters are individually configured.

Multiple mini-slots may be included in a single slot. Mini-slots for downlink and mini-slots for uplink may be included in a single slot. In a case that reception of mini-slots for the downlink is switched to transmission of mini-slots for the uplink in a terminal apparatus, it is preferable that a gap corresponding to the switching point of the downlink (for example, a receiving process of the terminal apparatus) and the uplink (for example, a transmitting process of the terminal apparatus) is included between the downlink mini-slots and the uplink mini-slots.

Configuration of a mini-slot (for example, the number of symbols constituting a mini-slot or SCS) may be specified based on various parameters configured for the physical channel and/or the physical signal included in the mini-slot. In a case that multiple mini-slots are included in a single subframe and/or a single slot, it is preferable that configurations of the mini-slots for a particular physical channel and/or a particular physical signal are identical in a single subframe and/or a single slot. For example, although it is preferable that configurations of physical channels including control information are identical in a single subframe and/or a single slot, configurations of physical channels including data information may be different in a single subframe and/or a single slot.

Whether to perform transmission and/or reception by using a mini-slot may be determined based on the capabilities supported by the terminal apparatus and the base station apparatus. In other words, the transmission and/or the reception using the mini-slot need not be performed until parameters associated with the mini-slot are configured via a common and/or individual higher layer signaling and/or physical layer signaling.

It is preferable that the mini-slot and the physical channel and/or the physical signal mapped in the mini-slot are not mapped on the subframe boundary (i.e., in a manner crossing adjacent subframes). It is also preferable that the mini-slot and the physical channel and/or the physical signal mapped in the mini-slot are not mapped on the slot boundary (between adjacent slots).

Figure 6:
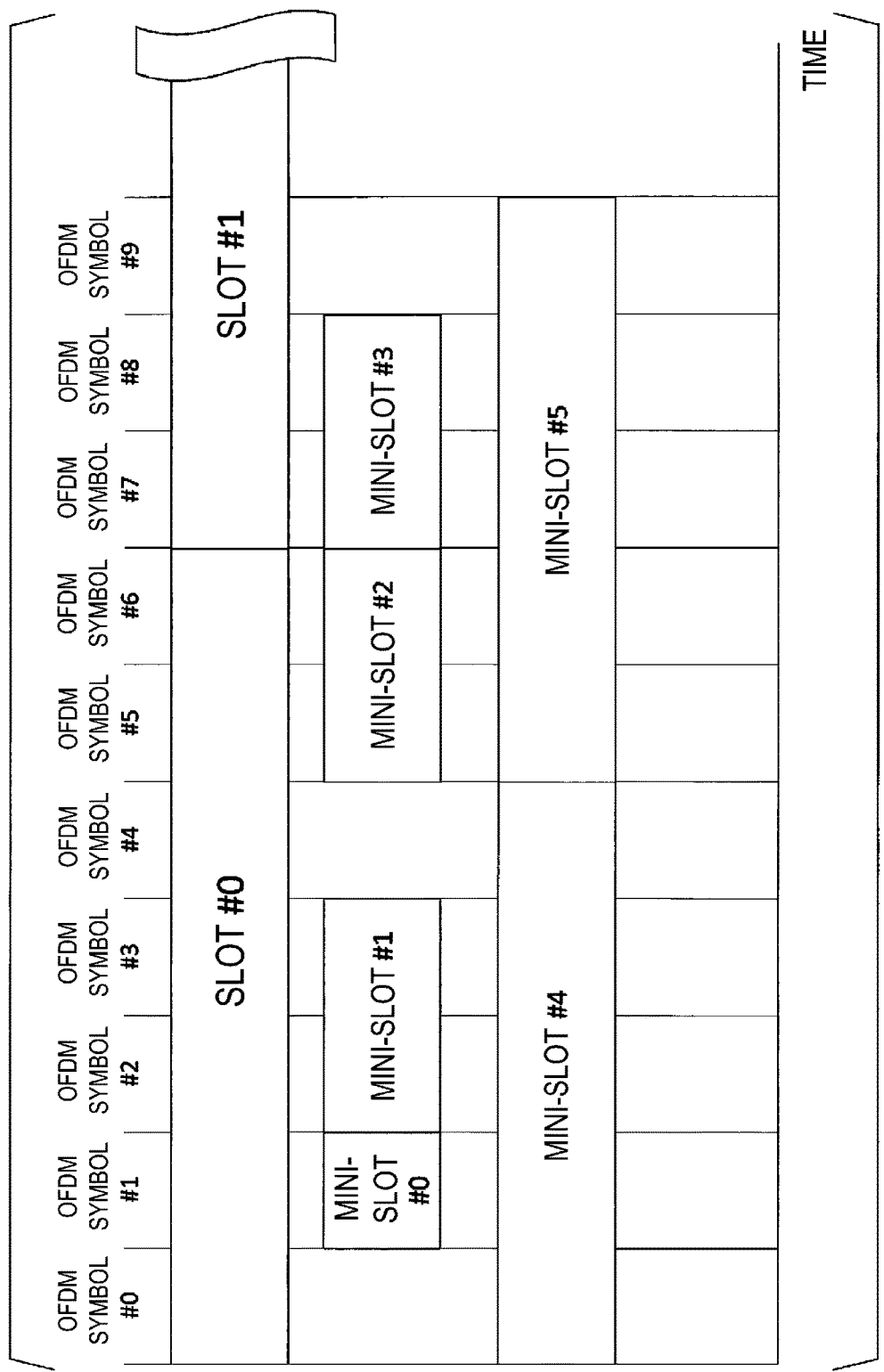
FIG. 6 is a diagram illustrating an example of a configuration of slots and mini-slots according to the first embodiment.

FIG. 6 illustrates an example of a configuration of slots and mini-slots according to the present embodiment. In FIG. 6, the number of OFDM symbols constituting a slot is 7. A mini-slot may include a smaller number of OFDM symbols than the number of OFDM symbols constituting a slot. The length of the mini-slot may be shorter than that of the slot. FIG. 6 illustrates mini-slots #0 to #5 as examples of mini-slot configuration. The mini-slot may include a single OFDM symbol, as indicated by the mini-slot #0. The mini-slot may include two OFDM symbols as indicated by the mini-slots #1 to #3. A gap may be inserted between two mini-slots, as indicated by the mini-slots #1 and #2. The mini-slot may be configured so as to cross the boundary between the slots #0 and #1, as indicated by the mini-slot #5. In other words, the mini-slot may be configured so as to cross the boundary between the slots. Here, the mini-slot is also referred to as a sub-slot. The mini-slot is also referred to as a short Transmission Time Interval (short TTI (sTTI)). In the following, the slot may be replaced by the mini-slot.

The mini-slot may include the same number of OFDM symbols as that of the slot. A mini-slot may include a larger number of OFDMs than the number of OFDM symbols constituting the slot. The length of the time domain of the mini-slot may be shorter than that of the slot. The length of the time domain of the mini-slot may be shorter than a single subframe (for example, 1 ms).

In a case that Radio Frequency (RF) bandwidth is different between successive subframes/slots/mini-slots, and a second RF bandwidth in a subsequent subframe/slot/mini-slot is wider than a first RF bandwidth in a preceding subframe/slot/mini-slot, the terminal apparatus need not expect to receive a physical channel and/or a physical signal in the subframe/slot/mini-slot with the second RF bandwidth in the absence of a gap which is longer than a prescribed time period between successive subframes/slots/mini-slots.

As for a ratio of the length of a symbol and the length of CP added for a single symbol corresponds to SCS, in a case that such ratios are the same, alignment at symbol level corresponding to different types and/or values of SCS may be performed. Here, the alignment at symbol level may be intended such that symbols corresponding to different SCSs are not mapped overlapping with respect to the boundaries of symbols in reference SCS. In other words, it may be intended that the symbol length or the CP length is adjusted such that symbols for different SCSs are mapped without overlapping with respect to the boundaries of symbols in certain SCS. For example, it is preferable that a symbol corresponding to second SCS is not mapped on the boundary of a symbol corresponding to first SCS.

Next, a physical channel and a physical signal according to the present embodiment will be described. The physical channel and the physical signal relating to downlink may be respectively referred to as a downlink physical channel and a downlink physical signal. The physical channel and the physical signal relating to uplink may be respectively referred to as an uplink physical channel and an uplink physical signal.

The physical channel for downlink may be used to transmit, for example, broadcast information, system information, paging information, various configuration information, Acknowledgement (ACK)/Negative Acknowledgement (NACK), user data, or control data. A resource allocation method or a sequence generation method used for the physical channel may be defined, according to each application. The downlink user data may include downlink shared data. The control data may include downlink control information (DCI). The control data may include a grant used for downlink and/or uplink scheduling. For example, the broadcast information may be transmitted via a physical broadcast channel. The paging information may be transmitted via a physical paging channel. The user data may be transmitted via a physical shared channel. The control data may be transmitted via a physical control channel. The broadcast information, the system information, and the paging information may be transmitted via a physical shared channel.

To be more specific, in downlink wireless communication from the base station apparatus 2 to the terminal apparatus 1, the following downlink physical channels may be used. The downlink physical channels may be used by the physical layer to transmit information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, BCH, Broadcast Channel), which are commonly used by the terminal apparatuses 1. The PBCH may be transmitted at a prescribed transmission interval. For example, the PBCH may be transmitted at an interval of 80 ms. The content of information included in the PBCH may be updated every 80 ms. The PBCH may include 288 subcarriers. The PBCH may include 2, 3, or 4 OFDM symbols. The MIB may include information on an identifier (index) of a synchronization signal. The MIB may include information for indicating at least some of the number of the slot in which PBCH is transmitted, the number of the subframe in which PBCH is transmitted, and the number of the radio frame in which PBCH is transmitted.

The PDCCH is used for transmitting downlink control information (DCI). The downlink control information may be referred to as DCI format. The DCI format may be specified based on the type or the number of bits of the DCI constituting a single DCI format. The downlink control information may include at least one of downlink grant or uplink grant. The downlink grant may be referred to as downlink assignment or downlink allocation.

A single downlink grant is at least used for scheduling of a single PDSCH within a single serving cell. The downlink grant may be used for at least scheduling of the PDSCH within the same slot as the slot in which the downlink grant has been transmitted.

A single uplink grant may be used at least for scheduling of a single PUSCH within a single serving cell.

In the terminal apparatus 1, one or more control resource sets (CORESETs) may be configured in order to search for the PDCCH. The terminal apparatus 1 may attempt to receive the PDCCH in the control resource set configured.

For control resource sets, the unit of mapping a control resource set may be a resource block in the frequency domain (frequency resource). The unit of mapping a control resource set may be an OFDM symbol in the time domain (time resource).

The frequency domain of the control resource set may be identical to the system bandwidth of the serving cell. The frequency domain of the control resource set may be provided based on at least the system bandwidth of the serving cell. The frequency domain of the control resource set may be provided based on at least higher layer signaling and/or downlink control information.

The time domain of the control resource set may be provided based on at least higher layer signaling and/or downlink control information.

The control resource set may include at least one or both of a common control resource set and a dedicated control resource set. The common control resource set may be a control resource set configured commonly to the multiple terminal apparatuses 1. The common control resource set may be provided based on at least MIB, first system information, second system information, common RRC signaling, cell ID, or the like. The dedicated control resource set may be a control resource set configured to be dedicatedly used for the terminal apparatus 1. The dedicated control resource set may be provided based on at least dedicated RRC signaling and/or a value of C-RNTI.

The control resource set may be a set of control channels (or control channel candidates) to be monitored by the terminal apparatus 1. The control resource set may include a set of control channels (or control channel candidates) to be monitored by the terminal apparatus 1. The control resource set may include one or more search spaces. The control resource set may be a single search space. The control resource set may include one or more types of search spaces. A monitoring period may be configured for each search space. The monitoring period may be defined as a higher layer parameter, may be configured included in system information, or may be configured with a default value.

The search space may include one or more PDCCH candidates. The terminal apparatus 1 receives a PDCCH candidate included in the search space and attempts to receive the PDCCH. Here, the PDCCH candidate may be referred to as a blind detection candidate.

The search area may include at least one or both of Common Search Space (CSS) and UE-specific Search Space (USS). The CSS may be a search space configured commonly to multiple terminal apparatuses 1. The USS may be a search space including a configuration to be dedicatedly used for the terminal apparatus 1. The CSS may be provided based on at least the MIB, the first system information, the second system information, the common RRC signaling, the cell ID, or the like. The USS may be provided based on at least the dedicated RRC signaling and/or the value of C-RNTI.

The common control resource set (C-CORESET) may include at least one or both of the CSS and the USS. The dedicated control resource set (D-CORESET) may include at least one or both of the CSS and the USS. The dedicated control resource set need not include the CSS.

A physical resource of the search space includes a Control Channel Element (CCE) of the control channel. The CCE may include a prescribed number of Resource Element Groups (REGs). For example, the CCE may include six REGs. A REG may include a single OFDM symbol of a single Physical Resource Block (PRB). In other words, the REG may include 12 Resource Elements (REs). The PRB may be referred to as simply a Resource Block (RB).

The PDSCH is used to transmit downlink data (DL-SCH, PDSCH). The downlink data may include parameters used for various measurements and transmit power configuration. The PDSCH may be used to transmit a random access message 2 (random access response). The PDSCH may be used to transmit system information including parameters used for initial access. The PDSCH may be used to transmit paging information.

The physical signal for downlink may be used to perform, for example, demodulation of a downlink physical channel, time-frequency synchronization (symbol alignment, SCS synchronization, slot synchronization, subframe synchronization), timing synchronization (timing adjustment), capture/detection of cell ID, Radio Resource Management (RRM) measurement, Channel State Information (CSI) measurement, beam management and/or beam capture, or positioning. A resource allocation method or a sequence generation method used for the physical signal may be defined, according to each application.

In downlink radio communication, the following downlink physical signals may be used. Although the downlink physical signal need not be used for transmission of information output from a higher layer, the downlink physical signal may be used in the physical layer.

Synchronization Signal (SS)

Downlink Reference Signal (DL RS)

The synchronization signal is used for the terminal apparatus 1 to establish synchronization in a frequency domain and a time domain in the downlink. The synchronization signal includes a Primary Synchronization Signal (PSS) and a Second Synchronization Signal (SSS). The synchronization signal may also include a Phase Tracking Reference Signal (PTRS) for measuring phase rotation. The synchronization signal may also include a Tracking Reference Signal (TRS) for frequency time synchronization.

A single set including at least a PSS, an SSS, and a PBCH may also be referred to as an SS block (SS and PBCH Block). The SS block may include system information. The PDCCH for scheduling the PDSCH including system information may be indicated, based on the PBCH included in the SS block. Indices used for identification may be different between different SS blocks. For SS block, multiple SS blocks may be transmitted in a prescribed time period. In this case, precoders or beams applied to the SS blocks may be different. Configuration of control resource sets for scheduling a PDSCH including system information may be included in a PBCH (in other words, MIB) in an SS block. The MIB may include parameters related to a transmit power value of the SS block.

The downlink reference signal is used for the terminal apparatus 1 to perform channel compensation on a downlink physical channel. The downlink reference signal is used for the terminal apparatus 1 to obtain the downlink channel state information.

In the present embodiment, the following downlink reference signals may be used.

DeModulation Reference Signal (DMRS)
Shared Reference Signal (Shared RS)
Channel State Information Reference Signal (CSI-RS)

The DMRS corresponds to transmission of the PDCCH and/or the PDSCH. The DMRS is multiplexed with the PDCCH or the PDSCH. The terminal apparatuses 1 may use the DMRS corresponding to the PDCCH or the PDSCH in order to perform channel compensation of the PDCCH or the PDSCH. Hereinafter, transmission of both a PDCCH and a DMRS corresponding to the PDCCH may be referred to as simply transmission of the PDCCH. Hereinafter, transmission of both a PDSCH and a DMRS corresponding to the PDSCH may be referred to as simply transmission of the PDSCH.

The DMRS may be an RS individually configured for the terminal apparatus 1. The sequence of the DMRS may be given at least based on parameters individually configured for the terminal apparatus 1. The DMRS may be individually transmitted for the PDCCH and/or the PDSCH. On the other hand, the Shared RS may be an RS commonly configured for multiple terminal apparatuses 1. The sequence of the Shared RS may be given regardless of the parameters individually configured for the terminal apparatus 1. For example, the sequence of Shared RS may be provided based on at least some of the slot number, the mini-slot number, and the cell ID. The Shared RS may be an RS to be transmitted regardless of whether the PDCCH and/or the PDSCH has been transmitted.

The Shared RS may correspond to transmission of at least the PDCCH. The Shared RS may be multiplexed with the PDCCH. The terminal apparatuses 1 may use the Shared RS in order to perform channel compensation of the PDCCH. Hereinafter, transmission of both the PDCCH and the Shared RS may be referred to as simply transmission of the PDCCH.

A CSI-RS may be used for RRM measurement such as a Reference Signal Received Power (RSRP), a Reference Signal Received Quality (RSRQ), a Received Signal Strength Indicator (RSSI), and a Received Signal-Signal to Noise and Interference Ratio (RS-SINR), or to measure CSI. CSI-RS configuration for the RRM measurement and CSI-RS configuration for the CSI measurement may be individually configured. The CSI-RS may be configured for an Interference Management Resource (IMR) measurement. The RSRP is received power obtained by the terminal apparatus 1 by measuring a particular signal under a particular condition. The RSRQ is reception quality obtained by the terminal apparatus 1 by measuring a particular signal under a particular condition. Note that the transmit power for the CSI-RS may be configured by a parameter separate from the SS block, or may be a power offset of the SS block. The parameter related to the transmit power for the CSI-RS may be configured via either first system information and/or second system information and/or higher layer signaling.

Note that RRM measurement such as RSRP, RSRQ, RSSI, and RS-SINR may be performed based on the PSS and/or the SSS in the SS block.

CSI-RSs may include a CSI-RS periodically transmitted with a higher layer parameter configured, and a CSI-RS whose transmission is indicated by a CSI request included in the DCI format.

The BCH, the UL-SCH, and the DL-SCH are transport channels. A channel used in a medium access control (MAC) layer is referred to as a transport channel. A unit of the transport channel used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 2 and the terminal apparatus 1 exchange (transmit and receive) signals in a higher layer. For example, in the radio resource control (RRC) layer, the base station apparatus 2 and the terminal apparatus 1 may transmit and/or receive RRC signaling (also referred to as an RRC message, RRC information). The base station apparatus 2 and the terminal apparatus 1 may transmit and/or receive a MAC Control Element (CE) in the MAC layer. Here, the RRC signaling and/or the MAC CE is also referred to as a higher layer signal or higher layer signaling.

The PUSCH and the PDSCH may be used at least to transmit the RRC signaling and the MAC CE. Here, the RRC signaling transmitted from the base station apparatus 2 via the PDSCH may be signaling common to multiple terminal apparatuses 1 in a cell. The signaling common to the multiple terminal apparatuses 1 in the cell may also be referred to as common RRC signaling. The RRC signaling transmitted from the base station apparatus 2 via the PDSCH may be signaling dedicated to a certain terminal apparatus 1 (also referred to as dedicated signaling or UE specific signaling). The signaling dedicated to the terminal apparatus 1 may also be referred to as dedicated RRC signaling. A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1. The PDSCH including the dedicated RRC signaling may be scheduled via the PDCCH in the first control resource set.

A Broadcast Control Channel (BCCH), a Common Control CHannel (CCCH), and a Dedicated Control Channel (DCCH) are logical channels. For example, the BCCH is a channel of the higher layer used to transmit the MIB. The Common Control Channel (CCCH) is a channel of the higher layer used to transmit information common to the multiple terminal apparatuses 1. Here, the CCCH is used for a terminal apparatus 1 that is not in an RRC connected state, for example. The Dedicated Control Channel (DCCH) is a channel of the higher layer used to transmit individual control information (dedicated control information) to the terminal apparatus 1. Here, the DCCH is used for a terminal apparatus 1 that is in the RRC connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel. Note that numerology may be configured for or associated with each logical channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

The physical channel for uplink may be used transmit, for example, capability information of the terminal apparatus, Acknowledgement (ACK)/Negative Acknowledgement (NACK), a report of the measurement result of RRM measurement or CSI measurement, user data, control data, and a random access preamble (random access information). A resource allocation method or a sequence generation method used for the physical channel may be defined, according to each application. Uplink user data may include uplink shared data. The user data and/or the control data may include uplink control information (UCI). The UCI may include feedback information relating to Hybrid Auto Repeat reQuest (HARQ) and CSI. The user data may be transmitted on a physical shared channel (PSCH). Note that the PSCH may include any of user data (shared data) and control data. The control data may be transmitted on a physical control channel (PCCH). The random access preamble may be transmitted on a physical random access channel (PRACH).

To be more specific, in uplink wireless communication from the terminal apparatus 1 to the base station apparatus 2, at least the following uplink physical channels may be used. The uplink physical channels may be used by a physical layer for transmission of information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes Channel State Information (CSI) of downlink channel, a scheduling request (SR) used to request a PUSCH (Uplink-Shared Channel (UL-SCH)) resource for initial transmission, and a Hybrid Automatic Repeat request ACKnowledgement (HARQ-ACK) for downlink data (Transport block (TB), Medium Access Control Protocol Data Unit (MAC PDU), Downlink-Shared Channel (DL-SCH), and Physical Downlink Shared Channel (PDSCH)). The HARQ-ACK indicates an acknowledgement (ACK) or a negative-acknowledgement (NACK). The HARQ-ACK is also referred to as HARQ feedback, HARQ information, HARQ control information, and ACK/NACK.

The channel state information (CSI) includes at least a channel quality indicator (CQI) and a rank indicator (RI). The channel quality indicator may include a precoder matrix indicator (PMI). The CQI is an indicator associated with channel quality (or propagation strength), and the PMI is an indicator indicating a precoder. The RI is an indicator indicating a transmission rank (or the number of transmission layers).

The PUSCH is used to transmit uplink data (TB, MAC PDU, UL-SCH). The PUSCH may be used to transmit the HARQ-ACK and/or channel state information along with the uplink data. The PUSCH may be used to transmit only the channel state information or to transmit only the HARQ-ACK and the channel state information. The PUSCH may be used to transmit a random access message 3 in a case of a random access procedure. The random access message 3 may be scheduled by a random access response grant.

The PRACH may be used to transmit a random access preamble (random access message 1). The PRACH is used to indicate an initial connection establishment procedure, a handover procedure, a connection re-establishment procedure, synchronization (timing adjustment) for transmission of uplink data, and a request for PUSCH (UL-SCH) resources. The random access preamble may be used to notify the base station apparatus 2 of an index (random access preamble index) provided by a higher layer of the terminal apparatus 1.

The random access preamble may be provided by cyclic-shifting of a Zadoff-Chu sequence corresponding to a physical root sequence index u. The Zadoff-Chu sequence may be generated based on the physical root sequence index u. In a single cell, multiple random access preambles may be defined. The random access preamble may be identified based on at least the index of the random access preamble. Different random access preambles corresponding to different indices of random access preambles may correspond to different combinations of the physical root sequence index u and the cyclic shift. The physical root sequence index u and the cyclic shift may be provided based on at least information included in the system information. The physical root sequence index u may be an index for identifying a sequence included in the random access preamble. The random access preamble may be identified based on at least the physical root sequence index u.

The physical signal for uplink may be used to perform, for example, demodulation of an uplink physical channel, time-frequency synchronization, timing synchronization and timing adjustment, channel state measurement, beam management and/or beam capture, or positioning of the terminal apparatus. A resource allocation method or a sequence generation method used for the physical signal may be defined, according to each application.

To be more specific, in uplink wireless communication, the following uplink physical signals may be used. Although the uplink physical signal need not be used for transmission of information output from a higher layer, the uplink physical signal may be used in the physical layer.

Uplink Reference Signal (UL RS)

According to the present embodiment, at least the following two types of uplink reference signal may be at least used.

Demodulation Reference Signal (DMRS)
Sounding Reference Signal (SRS)

The DMRS is associated with transmission of a PUSCH and/or a PUCCH. The DMRS is multiplexed with the PUSCH or the PUCCH. The base station apparatus 2 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS need not be associated with transmission of the PUSCH or the PUCCH. The base station apparatus 2 may use the SRS to measure the channel state. The SRS may be used by the base station apparatus 2 to measure the transmission beam (transmission precoding) of the terminal apparatus 1. The SRS may be used by the base station apparatus 2 to measure (evaluate) the RSRP or path loss for the uplink, or the uplink carrier frequency. The SRS may be used by the base station apparatus 2 to measure the timing for uplink. The SRS may be transmitted in the last OFDM symbol or a prescribed number of OFDM symbols from the last OFDM symbol inclusive in the subframe or the slot in the uplink slots. The transmission of SRS may be indicated based on an SRS request included in the uplink grant or the downlink grant. Multiple parameter sets of SRS may be configured for a single cell. In other words, one or more SRSs may be triggered in a single cell.

The resource allocation method and the sequence generation method may be different between downlink and uplink. Each physical channel may also be referred to as a physical channel including a certain piece of information or a certain set of data.

Next, numerology according to the present embodiment will be described.

The numerology according to the present embodiment may include one or all of the following parameters. The parameters described below may each be configured for each terminal apparatus, each cell (serving cell), each cell group, each beam (transmission precoding, reception precoding), each beam group (transmission precoding group, reception precoding group), each physical channel, and each MAC entity. The parameters described below may each correspond to an operating band. The parameters described below may each have a default value configured thereto. The parameters described below may each be configured by using at least one of broadcast information, system information, paging information, higher layer signal (RRC signaling), or DCI.

(A0) Subcarrier spacing (SCS)
(A1) Number of symbols constituting a slot/mini-slot
(A2) Time length (TTI length) of a slot/mini-slot
(A3) Length of a symbol
(A4) Length of CP added to a symbol
(A5) Number of symbols constituting a mini-slot
(A6) FFT size (sampling rate)

The time-frequency domain for monitoring the physical control channel may be referred to as a control resource set. The control resource set may be configured for both the Common Search Space (CSS) and the UE-specific Search Space (USS). In a case that multiple control resource sets can be configured, the numerology may be associated with each of the control resource sets.

Next, the random access procedure according to the present embodiment will be described. Random access is performed for initial access (initial connection), RRC connection re-establishment, handover, downlink data arrival, uplink data arrival, and timing adjustment.

Figure 7:
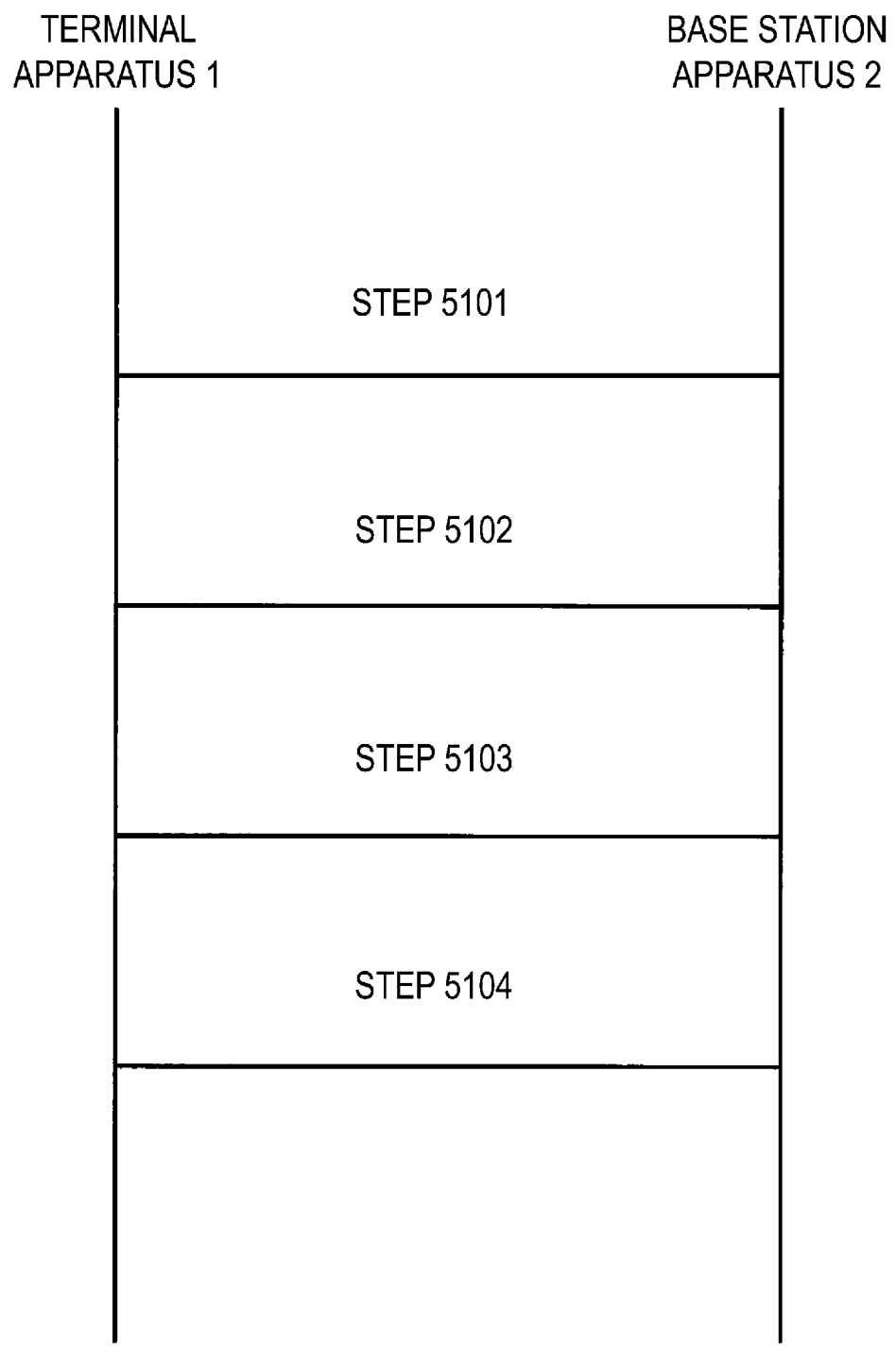
FIG. 7 is a diagram illustrating an example of a four-step random access procedure according to the first embodiment.

FIG. 7 illustrates an example of a 4-step random access procedure. Such a random access procedure may also be referred to as a contention based random access procedure. The random access procedure after the terminal apparatus 1 has established an RRC connection may also be referred to as a non-contention based random access procedure.

Step 5101 is a step in which the terminal apparatus 1 requests, via a physical channel, a target cell to respond for initial connection. Alternatively, step 5101 is a step in which the terminal apparatus 1 performs initial transmission to the target cell via the physical channel. Here, the physical channel may be a PRACH, for example. The physical channel may be a channel dedicatedly used to request a response for initial connection. The physical channel may be the PRACH. In step 5101, the message transmitted from the terminal apparatus 1 via the physical channel is also referred to as a random access message 1. The random access message 1 may be a random access preamble configured by higher layer signaling (higher layer parameter).

The terminal apparatus 1 performs downlink time-frequency synchronization prior to performing step 5101. In a first state, a synchronization signal is used for the terminal apparatus 1 to establish downlink time-frequency synchronization.

The synchronization signal including an ID of a target cell (cell ID) may be transmitted. The synchronization signal including a sequence generated at least based on the cell ID may be transmitted. The synchronization signal including the cell ID may means that the sequence of the synchronization signal is given based on the cell ID. The synchronization signal may be transmitted with application of a beam (or precoder).

The beam exhibits a phenomenon in which antenna gain varies depending on directions. The beam may be given at least based on the directivity of an antenna. The beam may also be given at least based on a phase transformation of a carrier signal. The beam may also be given by the application of the precoder.

The terminal apparatus 1 receives the PBCH transmitted from the target cell. The PBCH may be transmitted with the MIB included therein, the MIB including important system information used by the terminal apparatus 1 to connect to the target cell. The MIB is system information. The MIB may include information relating to the radio frame number. The MIB may include information relating to the location in a super frame including multiple radio frames (for example, information for indicating at least some of the system frame numbers (SFN) in the super frame). The PBCH may include an index of the synchronization signal. The PBCH may include information relating to reception (monitoring) of the PDCCH. The MIB may be mapped to the BCH in the transport channel. The MIB may be mapped to the BCCH in the logical channel.

The information relating to reception of the PDCCH may include information for indicating a control resource set. The information for indicating the control resource set may include information relating to the number of PRBs to which the control resource set is mapped. The information for indicating the control resource set may include information for indicating mapping of the control resource set. The information for indicating the control resource set may include information relating to the number of OFDM symbols to which the control resource set is mapped. The information for indicating the control resource set may include information for indicating the period (periodicity) of the slot to which the control resource set is mapped. The terminal apparatus 1 may attempt to receive the PDCCH based on at least the information for indicating the control resource set included in the PBCH.

The Information relating to reception of the PDCCH may include information relating to an ID for indicating the destination of the PDCCH. The ID for indicating the destination of the PDCCH may be an ID used for scrambling the CRC-bits to be added to the PDCCH. The ID for indicating the destination of the PDCCH is also referred to as a Radio Network Temporary Identifier (RNTI). Information relating to the ID used for scrambling the CRC bits added to the PDCCH may be included. The terminal apparatus 1 may attempt to receive the PDCCH based on at least the information relating to the ID included in the PBCH.

The RNTI may include a System Information-RNTI (SI-RNTI), a Paging-RNTI (a P-RNTI), a Common RNTI (C-RNTI), a Temporary C-RNTI, and a Random Access-RNTI (RA-RNTI). The SI-RNTI is used at least for scheduling the PDSCH transmitted with system information included therein. The P-RNTI is used at least for scheduling the PDSCH transmitted with paging information and/or information such as notification of change of the system information included therein. The C-RNTI may be used for scheduling user data for the terminal apparatus 1 in an RRC-connected state. The Temporary C-RNTI may be used for scheduling a random access message 4. The Temporary C-RNTI may be used to schedule the PDSCH including data to be mapped to the CCCH in the logical channel. The RA-RNTI may be used for scheduling the random access message 2.

The information relating to reception of the PDCCH may include information relating to an aggregation level of the search space included in the control resource set. The terminal apparatus 1 may identify the aggregation level of PDCCH candidates whose reception should be attempted and determine the search space, based on at least the information relating to the aggregation level of the search space included in the control resource set included in the PBCH.

The information relating to reception of the PDCCH may include information relating to a method for mapping a REG constituting the CCE. The information relating to the method for mapping the REG constituting the CCE may include information for indicating continuous mapping and non-continuous mapping. The information relating to the method for mapping the REG constituting the CCE may include information for indicating whether the method for mapping the REG constituting the CCE is Time-first mapping or Frequency-first mapping.

The base station apparatus 2 may transmit the PBCH including information relating to reception of the PDCCH, and indicate to the terminal apparatus 1 to monitor a first control resource set. The terminal apparatus 1 monitors the first control resource set based on at least detecting of information relating to reception of the PDCCH included in the PBCH. Here, the first control resource set may be used for scheduling the first system information. The first system information may include system information which is important for the terminal apparatus 1 to connect to the target cell. The first system information may include information relating to various downlink configurations. The first system information may include information relating to various PRACH configurations. The first system information may include information relating to various uplink configurations. The first system information may include information of a signal waveform (OFDM or DFT-s-OFDM) configured for transmission of the random access message 3. The first system information may include information relating to configuration of the SS block. The first system information may include information relating to configuration of the CSI-RS used for RRM measurement. In the first system information, one or more SS block configurations and/or CSI-RS configurations may be configured. The first system information may include information for indicating the transmit power used in the SS block and/or the CSI-RS. The first system information may also include at least a part of the system information other than the information included in the MIB. The first system information may be mapped to the BCH in the transport channel. The first system information may be mapped to the BCCH in the logical channel. The first system information may include at least a System Information Block type 1 (SIB1). The first system information may include at least a System Information Block type 2 (SIB2). The first control resource set may be used for scheduling the random access message 2. The SIB1 may include information relating to a measurement required to perform RRC connection. The SIB2 may include information relating to a channel which is common and/or shared among multiple terminal apparatuses 1 in a cell.

Configuration of the PDCCH and/or the control resource set to be monitored by the terminal apparatus 1 may include at least one of the following parameters. The following parameters may be configured for each serving cell.

(B0) bandwidth or number of resource blocks to be monitored
(B1) frequency position or frequency offset
(B2) transmission type or mapping type (for example, localized allocation or distributed allocation)
(B3) scrambling ID
(B4) start symbol
(B5) time domain (number of OFDM symbols, period)
(B6) configuration ID for identification (PDCCH ID, CORESET ID) in a case that multiple are configured
(B7) frequency hopping pattern in a case of being configured
(B8) number of repetitive transmissions in a case of being configured
(B9) parameter related to numerology in a case of being configured
(B10) parameter related to beam (precoding) in a case of being configured
(B11) aggregate level in a case of being configured The configurations for the PDCCH and/or the control resource set may be individually configured according to the purpose. For example, the first configuration relating to the PDCCH and/or the control resource set used for scheduling the physical shared channel including the paging information, and the second configuration relating to the PDCCH and/or the control resource set used for scheduling the physical shared channel including the system information may be individually configured. The third configuration relating to the PDCCH and/or the control resource set for scheduling the physical shared channel including the broadcast information may be configured independently of the first configuration and the second configuration. The configurations may be configured via higher layer signals.

Step 5102 is a step in which the base station apparatus 2 sends, to the terminal apparatus 1, a response to the random access message 1. The response is also referred to as the random access message 2. The random access message 2 may be transmitted via the PDSCH. The PDSCH including the random access message 2 is scheduled by the PDCCH. The CRC bits included in the PDCCH may be scrambled by the RA-RNTI. The random access message 2 may be transmitted with a special uplink grant included therein. The special uplink grant may be referred to as a random access response grant. The special uplink grant may be included in the PDSCH including the random access message 2. The random access response grant may include at least a Temporary C-RNTI. In other words, the random access message 2 may include the random access response grant.

The random access response grant may include a transmission power control command (TPC command) for indicating a correction value for the power control adjustment value used for the transmit power of the random access message 3.

The use of the power adjustment control value obtained by appropriately accumulating the correction value obtained from the received TPC command for transmit power may also be referred to as TPC accumulation. The use of a single correction value most recently received, without accumulating the correction value obtained from the TPC command, for transmit power as a power control adjustment value may also be referred to as TPC Absolute.

Step 5103 is a step in which the terminal apparatus 1 transmits, to the target cell, a request for RRC connection. The request for RRC connection is also referred to as a random access message 3. The random access message 3 may be transmitted via the PUSCH scheduled by the random access response grant. The random access message 3 may include an ID used to identify the terminal apparatus 1. The ID may be an ID managed in a higher layer. The ID may be an SAE Temporary Mobile Subscriber Identity (S-TMSI). The ID may be mapped to the CCCH in the logical channel.

Step 5104 is a step in which the base station apparatus 2 transmits a Contention resolution message to the terminal apparatus 1. The Contention resolution message may be referred to as a random access message 4. The terminal apparatus 1, after transmitting the random access message 3, monitors the PDCCH that performs scheduling of the PDSCH including the random access message 4. The random access message 4 may include a contention avoidance ID. Here, the contention avoidance ID is used to resolve a contention in which multiple terminal apparatuses 1 transmit signals by using a same radio resource. The contention avoidance ID may also be referred to as a UE contention resolution identity.

In step 5104, the terminal apparatus 1 which has transmitted the random access message 3 including the ID used for identifying the terminal apparatus 1 (S-TMSI, for example) monitors the random access message 4 including the Contention resolution message. In a case that the contention avoidance ID included in the random access message 4 is identical to the ID used to identify the terminal apparatus 1, the terminal apparatus 1 may consider that the contention resolution has been successfully completed, and set the value of the Temporary C-RNTI in the C-RNTI field. The terminal apparatus 1 having the value of the Temporary C-RNTI set in the C-RNTI field is considered to have completed an RRC connection.

The control resource set for monitoring the PDCCH that performs scheduling of the random access message 4 may be identical to the control resource set for monitoring the PDCCH that performs scheduling of the random access message 2. The base station apparatus 2 may transmit the information relating to reception of the PDCCH with the information relating to reception of the PDCCH included in the random access message 2, and indicate to the terminal apparatus 1 to monitor the second control resource set. The terminal apparatus 1 monitors the PDCCH based on at least the information relating to reception of the PDCCH included in the random access message 2. The second control resource set may be used for scheduling a random access message 5.

The terminal apparatus may notify, as capability information, the support of a capability relating to simultaneous reception of multiple numerologies, in a case that simultaneous monitoring of physical control channels for multiple numerologies is performed in at least a single serving cell.

Figure 8:
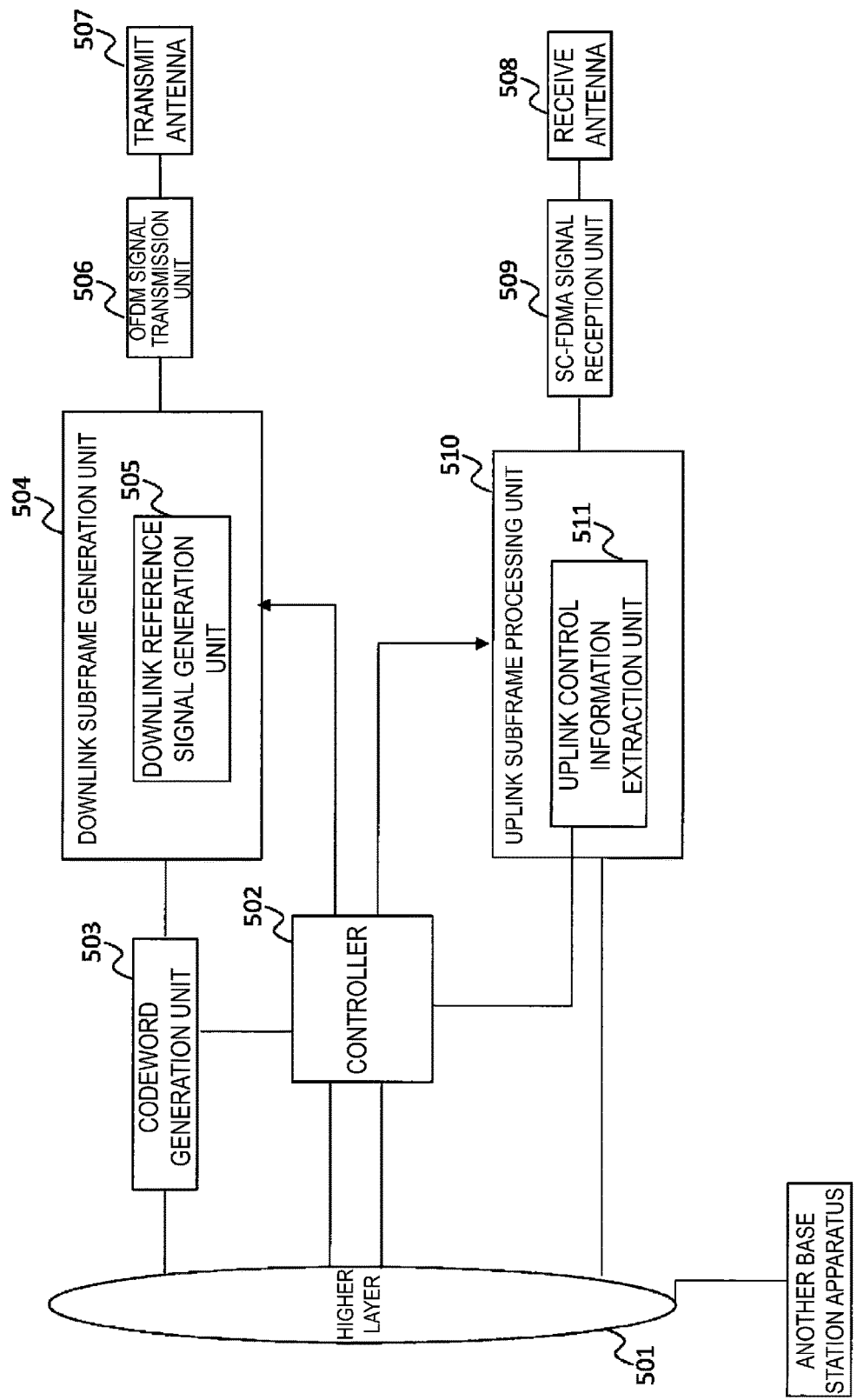
FIG. 8 is a diagram illustrating an example of a block configuration of a base station apparatus 2 according to the first embodiment.

FIG. 8 is a schematic diagram illustrating an example of a block configuration of a base station apparatus 2 according to the present embodiment. The base station apparatus 2 includes a higher layer (higher layer control information notification unit) 501, a controller (base station controller) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA (DFT-S-OFDM) signal reception unit (channel state measurement unit and/or CSI reception unit) 509, and an uplink subframe processing unit 510. The downlink subframe generation unit 504 includes a downlink reference signal generation unit 505. The uplink subframe processing unit 510 includes an uplink control information extraction unit (CSI acquisition unit/HARQ-ACK acquisition unit/SR acquisition unit) 511. The SC-FDMA signal reception unit 509 also serves as a measurement unit of received signals, Clear Channel Assessment (CCA), and interference noise power. The SC-FDMA signal reception unit 509 may be an OFDM signal reception unit, or may include an OFDM signal reception unit, in a case that the terminal apparatus 1 supports transmission of OFDM signals. Although not illustrated, the base station apparatus 2 may include a transmitter configured to transmit a Timing Advance (TA) command.

The downlink subframe generation unit 504 may be a downlink Transmit Time Interval (TTI) generation unit or may include a downlink TTI generation unit. The downlink TTI generation unit may generate a physical channel and/or a physical signal constituting the downlink TTI. In other words, the downlink subframe generation unit 504 including the downlink TTI generation unit may generate a sequence for the physical channel and/or the physical signal to be transmitted. The downlink subframe generation unit 504 including the downlink TTI generation unit may map the generated sequence to the physical resource. The same may go for uplink. The downlink subframe generation unit 504 may include a downlink slot generation unit. In other words, the downlink subframe generation unit 504 may generate the physical channel and/or physical signal to be transmitted in the downlink slot. The downlink subframe generation unit 504 may include a downlink mini-slot generation unit. In other words, the downlink subframe generation unit 504 may generate the physical channel and/or physical signal to be transmitted in the downlink mini-slot.

The uplink subframe processing unit 510 may include an uplink slot processing unit. In other words, the uplink subframe processing unit 510 may perform processing of the physical channel and/or physical signal transmitted in the uplink slot. The uplink subframe processing unit 510 may include an uplink mini-slot processing unit. In other words, the uplink subframe processing unit 510 may perform processing of the physical channel and/or physical signal to be transmitted in the uplink mini-slot.

Figure 9:
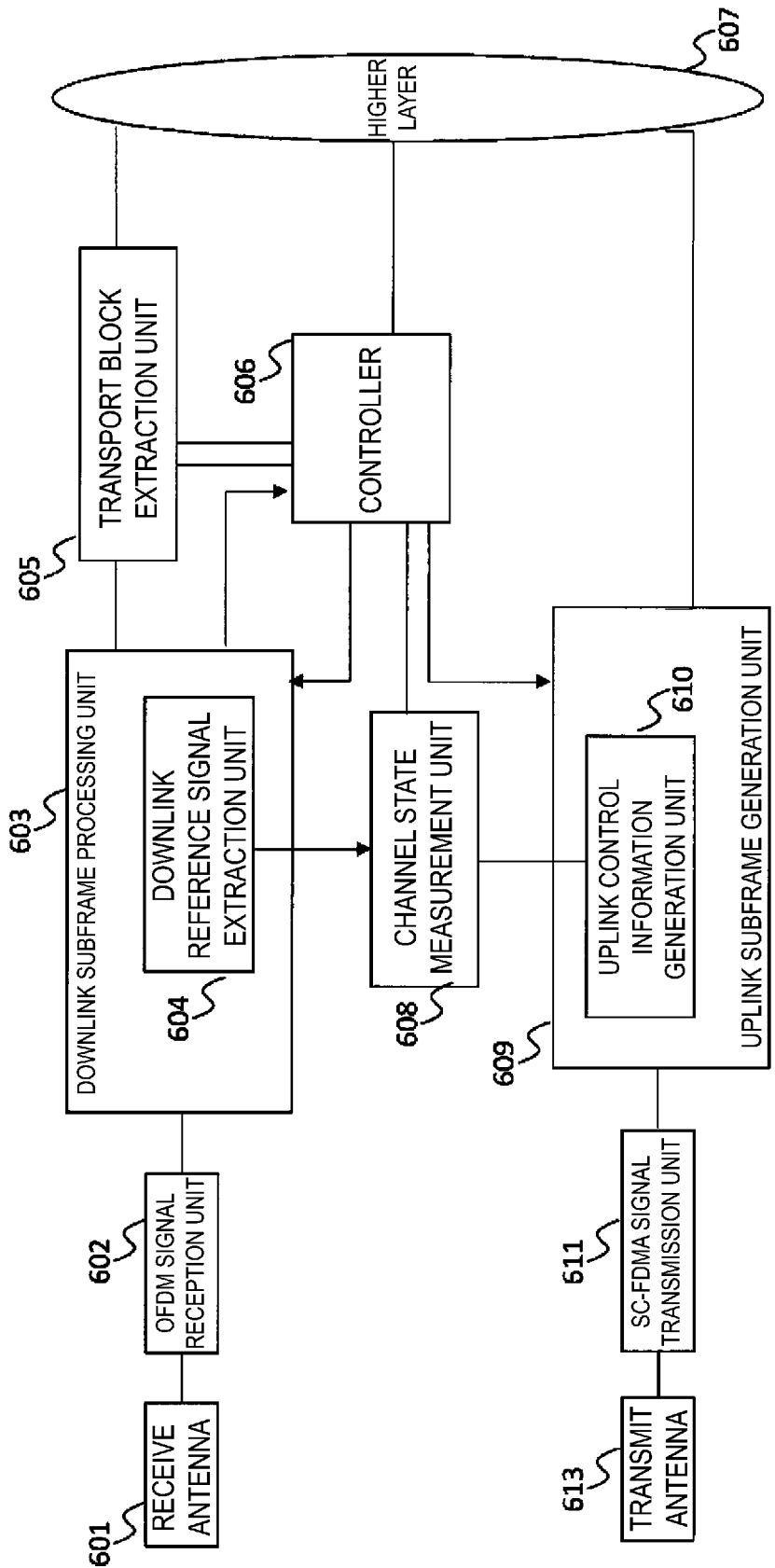
FIG. 9 is a diagram illustrating an example of a block configuration of a terminal apparatus 1 according to the first embodiment.

FIG. 9 is a schematic diagram illustrating an example of a block configuration of a terminal apparatus 1 according to the present embodiment. The terminal apparatus 1 has a receive antenna (terminal receive antenna) 601, an OFDM signal reception unit (downlink reception unit) 602, a downlink subframe processing unit 603, a transport block extraction unit (data extraction unit) 605, a controller (terminal controller) 606, a higher layer (higher layer control information acquisition unit, higher layer processing unit) 607, a channel state measurement unit (CSI generation unit) 608, an uplink subframe generation unit 609, an SC-FDMA signal transmission units (UCI transmission units) 611 and 612, and transmit antennas (terminal transmit antennas) 613 and 614. The downlink subframe processing unit 603 includes a downlink reference signal extraction unit 604. The downlink subframe processing unit 603 may be a downlink TTI processing unit. The downlink subframe processing unit 603 may include a downlink slot processing unit. In other words, the downlink subframe processing unit 603 may perform processing of the physical channel and/or physical signal to be transmitted in the downlink slot. The downlink subframe processing unit 603 may include a downlink mini-slot processing unit. In other words, the downlink subframe processing unit 603 may perform processing of the physical channel and/or physical signal to be transmitted in the downlink mini-slot. The uplink subframe generation unit 609 includes an uplink control information generation unit (UCI generation unit) 610. The OFDM signal reception unit 602 also serves as a measurement unit of received signals, CCA, and interference noise power. In other words, RRM measurement may be performed in the OFDM signal reception unit 602. In a case that the terminal apparatus supports transmission of OFDM signals, the SC-FDMA signal transmission unit may be the OFDM signal transmission unit, or may include the OFDM signal transmission unit.

The uplink subframe generation unit 609 may be an uplink TTI generation unit or may include an uplink TTI generation unit. The uplink TTI generation unit may generate a physical channel and/or a physical signal constituting the uplink TTI. In other words, the uplink subframe generation unit 609 including the uplink TTI generation unit may generate a sequence for the physical channel and/or the physical signal to be transmitted. The uplink subframe generation unit 609 including the uplink TTI generation unit may map the generated sequence to the physical resource. The uplink subframe generation unit 609 may include an uplink slot generation unit. In other words, the uplink subframe generation unit 609 may generate the physical channel and/or physical signal to be transmitted in the uplink slot. The uplink subframe generation unit 609 may include an uplink mini-slot generation unit. In other words, the uplink subframe generation unit 609 may generate the physical channel and/or physical signal to be transmitted in the uplink mini-slot. The terminal apparatus 1 may include a power control unit for controlling/setting the transmit power of the uplink signal. Although not illustrated, the terminal apparatus 1 may include a measurement unit for measuring a time difference between reception and transmission of the terminal apparatus 1. The terminal apparatus 1 may include a transmitter configured to report the measurement result of the time difference.

In each of FIG. 8 and FIG. 9, the higher layer may include the Medium Access Control (MAC) layer, the Radio Link Control (RLC) layer, the Packet Data Convergence Protocol (PDCP) layer, and the Radio Resource Control (RRC) layer. The higher layer may also be referred to as a higher layer processing unit.

The RLC layer performs Transparent Mode (TM) data transmission to the higher layer (for example, PDCP layer or RRC layer), Unacknowledged Mode (UM) data transmission, and Acknowledged Mode (AM) data transmission including an indication indicating that transmission of the higher layer Packet Data Unit (PDU) has succeeded. Data transmission to the lower layer is performed, and a transmission opportunity, together with the total size of the RLC PDU transmitted in the transmission opportunity is notified to the lower layer.

The RLC layer supports a function relating to transmission of the higher layer PDU, a function relating to error correction via an Automatic Repeat reQuest (ARQ) (only for AM data transmission), a function relating to combination/division/reconstruction of the RLC Service Data Unit (SDU) (only for UM and AM data transmission, a function relating to redivision of the RLC data PDU (only for AM data transmission), a function relating to sorting of the RLC data PDU (only for AM data transmission), a function relating to duplication detection (only for UM and AM data transmission), a function relating to discarding of RLC SDU (only for UM and AM data transmission), a function relating to re-establishment of the RLC, and a function relating to protocol error detection (only for AM data transmission).

First, a flow of downlink data transmission and/or reception will be described with reference to FIG. 8 and FIG. 9. In the base station apparatus 2, the controller 502 holds an Modulation and Coding Scheme (MCS) for indicating the modulation scheme, the coding rate, or the like in downlink; downlink resource allocation for indicating the RB used for data transmission; and information used for HARQ control (redundancy version, HARQ process number, and New Data Indicator (NDI), and controls the codeword generation unit 503 and the downlink subframe generation unit 504 based on these parameters/information. The downlink data (also referred to as a downlink transport block, downlink shared data, downlink shared transport block) transmitted from the higher layer 501 is subjected to processing such as error correction coding and rate matching, under the control by the controller 502 in the codeword generation unit 503, and a codeword is generated. Two codewords at maximum are transmitted at the same time in a single subframe of a single cell. In the downlink subframe generation unit 504, a downlink subframe/downlink slot/downlink mini-slot is generated according to the indication from the controller 502. First, the codeword generated in the codeword generation unit 503 is converted into a modulation symbol sequence through a modulation process, such as Phase Shift Keying (PSK) modulation and Quadrature Amplitude Modulation (QAM). The modulation symbol sequence is mapped to REs of some RBs, and a downlink subframe/downlink slot/downlink mini-slot for each antenna port is generated through a precoding process. On this occasion, a transmission data sequence transmitted from the higher layer 501 includes higher layer control information, which is control information in the higher layer (for example, dedicated (individual) RRC signaling). In the downlink reference signal generation unit 505, a downlink reference signal is generated. The downlink subframe generation unit 504 maps the downlink reference signal to the RE in the downlink subframe/downlink slot/downlink mini-slot according to the indication from the controller 502. The downlink subframe/downlink slot/downlink mini-slot generated by the downlink subframe generation unit 504 is modulated to an OFDM signal in the OFDM signal transmission unit 506, and transmitted via the transmit antenna 507. Although a configuration including one OFDM signal transmission unit 506 and one transmit antenna 507 is provided as an example here, another configuration may include multiple OFDM signal transmission units 506 and transmit antennas 507 in a case that downlink subframes are transmitted by using multiple antenna ports. The downlink subframe generation unit 504 may also have a capability of generating a physical-layer downlink control channel, such as a physical control channel/physical shared channel, and mapping it to the RE of the downlink slot and/or the downlink mini-slot in the downlink subframe. Multiple base station apparatuses each transmit a downlink slot or a downlink mini-slot included in an individual downlink subframe.

In the terminal apparatus 1, the OFDM signal is received by the OFDM signal reception unit 602 via the receive antenna 601, and an OFDM demodulation process is performed on the received signal.

The downlink subframe processing unit 603 first detects a physical-layer downlink control channel such as a physical control channel. More specifically, the downlink subframe processing unit 603 performs decoding on the assumption that the physical control channel has been transmitted in a region to which the physical control channel/physical shared channel is allocated, and checks preliminarily added Cyclic Redundancy Check (CRC) bits. In other words, the downlink subframe processing unit 603 monitors the physical control channel/physical shared channel. In a case that the CRC bits matches an ID which has been preliminarily assigned by the base station apparatus (a terminal-specific identifier (UEID), such as a Cell-Radio Network Temporary Identifier (C-RNTI) and a Semi-Persistent Scheduling-C-RNTI (SPS-C-RNTI), that is assigned to a terminal, or a Temporary C-RNTI), the downlink subframe processing unit 603 recognizes that the physical control channel/physical shared channel has been detected and extracts the physical shared channel by using DCI included in the detected physical control channel.

The controller 606 holds an MCS for indicating a modulation scheme, a coding rate, and the like in the downlink based on the control information, downlink resource allocation for indicating a RB to be used for downlink data transmission, and information to be used for HARQ control, and controls the downlink subframe processing unit 603, the transport block extraction unit 605, and the like based on these parameters/information. More specifically, the controller 606 controls so as to perform an RE demapping process, a demodulation process, and the like that correspond to an RE mapping process and a modulation process in the downlink subframe generation unit 504. The PDSCH extracted from the received downlink subframe is transmitted to the transport block extraction unit 605. The downlink reference signal extraction unit 604 in the downlink subframe processing unit 603 extracts the DLRS from the downlink subframe/downlink slot/downlink mini-slot.

The transport block extraction unit 605 performs a rate matching process, an error correction decoding, and the like that correspond to a rate matching process and an error correction coding in the codeword generation unit 503, and a transport block is extracted and transmitted to the higher layer 607. The transport block includes the higher layer control information, and the higher layer 607 notifies the controller 606 of a required physical-layer parameter, based on the higher layer control information. Multiple base station apparatuses 2 respectively transmit individual downlink subframes/downlink slots/downlink mini-slots, which are received by the terminal apparatus 1, and therefore the above-described process may be performed on each of the downlink subframes/downlink slots/downlink mini-slots for each of the multiple base station apparatuses 2. On this occasion, the terminal apparatus 1 may or may not recognize that multiple downlink subframes/downlink slots/downlink mini-slots are transmitted from the multiple base station apparatuses 2. In a case that the recognition is not performed, it suffices for the terminal apparatus 1 to merely recognize that multiple downlink subframes/downlink slots/downlink mini-slots are transmitted in multiple cells. The transport block extraction unit 605 determines whether the transport block has been detected correctly and transmits a result of the determination to the controller 606.

Here, the transport block extraction unit 605 may include a buffer unit (soft buffer unit). The buffer unit is capable of temporarily storing information of the extracted transport block. For example, the transport block extraction unit 605, in a case of receiving a same transport block (retransmitted transport block), attempts to combine (compose) the data for the transport block temporarily stored in the buffer unit with the newly received data and decode the combined data, provided that decoding of the data for the transport block has not succeeded. In a case that the temporarily stored data is no longer necessary, or satisfies a prescribed condition, the buffer unit flushes the data. The condition of the data to be flushed may vary according to the type of transport block corresponding to the data. The buffer unit may be prepared for each type of data. For example, a message 3 buffer or a HARQ buffer may be prepared as the buffer unit, or the buffer unit may be prepared for each layer such as L1/L2/L3. Here, flushing of information/data implies flushing a buffer storing information or data therein.

Next, a flow of uplink signal transmission and/or reception will be described. In the terminal apparatus 1, a downlink reference signal extracted by the downlink reference signal extraction unit 604 is transmitted to the channel state measurement unit 608 under the indication from the controller 606, the channel state and/or interference is measured by the channel state measurement unit 608, and further CSI is calculated based on the measured channel state and/or interference. The channel state measurement unit 608 may measure the intensity of a beam from the base station apparatus 2, or detect a resource corresponding to the beam. The controller 606 indicates to the uplink control information generation unit 610 to generate an HARQ-ACK (DTX (not transmitted yet), ACK (detection succeeded), or NACK (detection failed)) and map the resultant to a downlink subframe based on a result of the determination of whether the transport block is correctly detected. The terminal apparatus 1 performs the processes on the downlink subframe/downlink slot/downlink mini-slot for each of the multiple cells. In the uplink control information generation unit 610, a PUCCH including the calculated CSI and/or HARQ-ACK, or a control channel/shared channel corresponding to the PUCCH is generated. In the uplink subframe generation unit 609, the physical shared channel including the uplink data transmitted from the higher layer 607 and the physical control channel generated by the uplink control information generation unit 610 are mapped to the RB of the uplink slot or the uplink mini-slot in the uplink subframe, and the uplink slot or the uplink mini-slot are generated.

The SC-FDMA signal is received by the SC-FDMA signal reception unit 509 via the receive antenna 508, and an SC-FDMA demodulation process is performed. The uplink subframe processing unit 510 extracts the RB to which the physical control channel is mapped, according to an indication from the controller 502, and the uplink control information extraction unit 511 extracts the CSI included in the physical control channel. The extracted CSI is sent to the controller 502. The CSI is used for control of downlink transmission parameters (MCS, downlink resource allocation, HARQ, transmit beam, receive beam, and the like) by the controller 502. The SC-FDMA signal reception unit may be the OFDM signal reception unit. The SC-FDMA signal reception unit may include the OFDM signal reception unit.

A part of the terminal apparatus and/or the base station apparatus according to the embodiment described above may be realized by a computer. In such a case, a program for realizing such control functions may be recorded on a computer-readable recording medium to cause a computer system to read the program recorded on the recording medium for execution.

Here, a "computer system" is intended to be a computer system built in the terminal apparatus or the base station apparatus, and include an OS and hardware such as peripheral devices. "Computer-readable recording medium" may include a portable medium such as a flexible disk, magneto-optical disk, ROM, CD-ROM, or a storage device such as a hard disk built in the computer system.

Furthermore, a "computer-readable recording medium" may include a medium, such as a communication line for transmitting the program via a network such as the Internet or via a communication circuit such as a telephone circuit, that dynamically holds a program for a short period of time, or a medium, such as a volatile memory in the computer system serving as a server or a client in such a case, that holds the program for a certain period of time. A "computer-readable recording medium" may be an external memory. The above-described program may be one for realizing a part of the functions described above, and further may be one that can realize the above-described functions in combination with programs already recorded in the computer system.

The base station apparatus according to the above-described embodiment may be realized as an aggregation (apparatus group) including multiple apparatuses. Each of the apparatuses constituting an apparatus group may include some or all of the functions or functional blocks of the base station apparatus according to the above-described embodiment. The apparatus group is required to have a complete set of functions or functional blocks of the base station apparatus. The terminal apparatus according to the above-described embodiment is also capable of communicating with the base station apparatus as the aggregation.

The base station apparatus according to the above-described embodiment may be the Evolved Universal Terrestrial Radio Access Network (EUTRAN) and/or the NextGen RAN, NR RAN (NG-RAN). The base station apparatus 2 according to the above-described embodiment may have some or all of the functions of a higher node relative to the eNB and/or the gNB.

Some or all of the terminal apparatus and the base station apparatus according to the above-described embodiment may be realized as an LSI, which is typically an integrated circuit, or as a chip set. Each functional block of the terminal apparatus and the base station apparatus may be individually realized as a chip, or some or all of the functional blocks may be integrated into a chip. The integrated circuit technique is not limited to LSI, and may be realized as a dedicated circuit or a general-purpose processor. In a case that with advances in semiconductor technology, a circuit integration technology with which an LSI is replaced appears, it is also possible to use an integrated circuit based on the technology.

Although a cellular mobile station apparatus (cellular phone, mobile apparatus) has been described as an example of the terminal apparatus or the communication apparatus in the above-described embodiments, the present invention is not limited thereto, and may be applied to a terminal apparatus or a communication apparatus of a stationary, or non-mobile electronic apparatus installed indoors or outdoors such as an AV apparatus, kitchen equipment (for example, a refrigerator or a micro-wave oven), a vacuum cleaner or a washing machine, an air-conditioning apparatus, office equipment, a vending a machine, a car-mounted apparatus such as car navigation device, and other household apparatuses.

As has been described above, an aspect of the present invention provides the following characteristics.

(1) A terminal apparatus according to an aspect of the present invention includes: a receiver configured to receive first information related to query for capability of the terminal apparatus; and a transmitter configured to transmit second information related to the capability of the terminal apparatus, wherein the second information includes third information related to a band combination of operating bands used for carrier aggregation (CA), the band combination supported by the terminal apparatus, and in a case that more than one subcarrier spacings (SCSs) are supported by the terminal apparatus in each of the operating bands, the third information includes fourth information related to a SCS combination that can be applied to the band combination.

(2) A terminal apparatus according to an aspect of the present invention is the above-described terminal apparatus, wherein in a case that the SCS combination corresponding to a first band combination of the band combinations is a SCS combination having a same SCS, a SCS of the more than one SCSs for a first carrier and a SCS of the more than one SCSs for a second carrier corresponding to the first band combination are configured based on a common first parameter.

(3) A terminal apparatus according to an aspect of the present invention is the above-described terminal apparatus, wherein in a case that the SCS combination corresponding to a second band combination of the band combinations can be individually configured, a SCS of the more than one SCSs for a third carrier and a SCS of the more than one SCSs for a fourth carrier corresponding to the second band combination each are configured by using a second parameter individually set for the third carrier and the fourth carrier.

(4) A terminal apparatus according to an aspect of the present invention includes: a receiver configured to receive first information related to query for capability of the terminal apparatus; and a transmitter configured to transmit second information related to the capability of the terminal apparatus, wherein the second information includes third information and fourth information, the third information indicates a band combination of operating bands, the band combination supported by the terminal apparatus, the band combination includes a first operating band and a second operating band paired with the first operating band, and the fourth information indicates a subcarrier spacing for downlink and a subcarrier spacing for uplink in the first operating band, and a subcarrier spacing for uplink in the second operating band.

(5) A terminal apparatus according to an aspect of the present invention is the above-described terminal apparatus, wherein the fourth information further indicates a subcarrier spacing for downlink for the second operating band.

(6) A method according to an aspect of the present invention is a method for a terminal apparatus, the method including the steps of: receiving first information related to query for capability of the terminal apparatus; transmitting second information related to the capability of the terminal apparatus; causing third information related to a band combination of operating bands used for carrier aggregation (CA) to be included in the second information, the band combination supported by the terminal apparatus; and in a case that more than one subcarrier spacings (SCSs) are supported by the terminal apparatus in each of the operating bands, causing fourth information related to a SCS combination that can be applied to the band combination in the third information.

(7) A method according to an aspect of the present invention is a method for a terminal apparatus, the method including the steps of: receiving first information related to query for capability of the terminal apparatus; and transmitting second information related to the capability of the terminal apparatus, wherein the second information includes third information and fourth information, the third information indicates a band combination of operating bands, the band combination supported by the terminal apparatus, the band combination includes a first operating band and a second operating band paired with the first operating band, and the fourth information indicates a subcarrier spacing for downlink and a subcarrier spacing for uplink in the first operating band, and a subcarrier spacing for uplink in the second operating band.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of one aspect of the present invention defined by claims, and embodiments that are made by suitably combining technical means disclosed according to the different embodiments are also included in the technical scope of the present invention. A configuration in which components mentioned in the above-described embodiments and exhibiting similar effects are substituted for each other is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

501 Higher layer
502 Controller
503 Codeword generation unit
504 Downlink subframe generation unit
505 Downlink reference signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606 Controller
607 Higher layer
608 Channel state measurement unit
609 Uplink subframe generation unit
610 Uplink control information generation unit
611, 612 SC-FDMA signal transmission unit
613, 614 Transmit antenna

The invention claimed is:
1. A terminal apparatus, comprising:
a receiver configured to receive first information related to a query for capability of the terminal apparatus; and
a transmitter configured to transmit second information related to the capability of the terminal apparatus, wherein:
the second information includes third information related to a band combination of operating bands used for carrier aggregation (CA), the band combination supported by the terminal apparatus,
a plurality of subcarrier spacings (SCSs) are supported by the terminal apparatus in each of the operating bands,
the third information includes fourth information related to an SCS combination that is applied to the band combination,
an SCS combination corresponding to a first band combination of band combinations is individually configured, and
an SCS of the plurality of SCSs for a first carrier and an SCS of the plurality of SCSs for a second carrier corresponding to the first band combination each is configured by using a first parameter individually set for the first carrier and the second carrier.

2. The terminal apparatus according to claim 1, wherein:
an SCS combination corresponding to a second band combination of the band combinations is an SCS combination having a same SCS, and
an SCS of the plurality of SCSs for a third carrier and an SCS of the plurality of SCSs for a fourth carrier corresponding to the second band combination are configured based on a common second parameter.

3. A terminal apparatus, comprising:
a receiver configured to receive first information related to a query for capability of the terminal apparatus; and
a transmitter configured to transmit second information related to the capability of the terminal apparatus, wherein:
the second information includes third information and fourth information,
the third information indicates a band combination of operating bands, the band combination supported by the terminal apparatus,
the band combination includes a first operating band and a second operating band paired with the first operating band,
the fourth information indicates a subcarrier spacing for downlink and a subcarrier spacing for uplink in the first operating band, and a subcarrier spacing for uplink in the second operating band,
an SCS combination corresponding to a first band combination of band combinations is individually configured, and
an SCS of a plurality of SCSs for a first carrier and an SCS of the plurality of SCSs for a second carrier corresponding to the first band combination each is configured by using a first parameter individually set for the first carrier and the second carrier.

4. The terminal apparatus according to claim 3, wherein the fourth information further indicates a subcarrier spacing for downlink for the second operating band.

5. A method performed by a terminal apparatus, the method comprising:
receiving first information related to a query for capability of the terminal apparatus; and
transmitting second information related to the capability of the terminal apparatus, wherein:
the second information includes third information related to a band combination of operating bands used for carrier aggregation (CA), the band combination supported by the terminal apparatus,
a plurality of subcarrier spacings (SCSs) are supported by the terminal apparatus in each of the operating bands, the third information includes fourth information related to an SCS combination that is applied to the band combination, an SCS combination corresponding to a first band combination of band combinations is individually configured, and an SCS of the plurality of SCSs for a first carrier and an SCS of the plurality of SCSs for a second carrier corresponding to the first band combination each is configured by using a first parameter individually set for the first carrier and the second carrier.

6. A method performed by a terminal apparatus, the method comprising:

receiving first information related to a query for capability of the terminal apparatus; and transmitting second information related to the capability of the terminal apparatus, wherein:

the second information includes third information and fourth information, the third information indicates a band combination of operating bands, the band combination supported by the terminal apparatus, the band combination includes a first operating band and a second operating band paired with the first operating band, the fourth information indicates a subcarrier spacing for downlink and a subcarrier spacing for uplink in the first operating band, and a subcarrier spacing for uplink in the second operating band, an SCS combination corresponding to a first band combination of band combinations is individually configured, and an SCS of a plurality of SCSs for a first carrier and an SCS of the plurality of SCSs for a second carrier corresponding to the first band combination each is configured by using a first parameter individually set for the first carrier and the second carrier.

* * * * *